(12) United States Patent
Kamiya et al.

(10) Patent No.: US 7,298,694 B2
(45) Date of Patent: Nov. 20, 2007

(54) APPARATUS AND METHOD FOR GFP FRAME TRANSFER

(75) Inventors: Satoshi Kamiya, Tokyo (JP); Motoo Nishihara, Tokyo (JP); Ryuichi Ikematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 697 days.

(21) Appl. No.: 10/022,594

(22) Filed: Dec. 20, 2001

(65) Prior Publication Data

US 2002/0090007 A1 Jul. 11, 2002

(30) Foreign Application Priority Data

Dec. 26, 2000 (JP) .............. 2000-396290

(51) Int. Cl.
*H04L 1/00* (2006.01)
*H04L 12/56* (2006.01)
*H04J 3/00* (2006.01)
*H04J 3/24* (2006.01)

(52) U.S. Cl. .............. 370/218; 370/242; 370/401; 370/474; 370/476

(58) Field of Classification Search .............. 370/218, 370/242, 243, 244, 245, 401, 395.3, 395.5, 370/395.51, 395.53, 395.6, 402, 403, 470, 370/474, 476, 903, 906, 907
See application file for complete search history.

(56) References Cited

U.S. PATENT DOCUMENTS

| | | | | |
|---|---|---|---|---|
| 4,638,477 A | * | 1/1987 | Okada et al. | 370/400 |
| 6,014,767 A | * | 1/2000 | Glaise | 714/776 |
| 6,134,245 A | * | 10/2000 | Scarmalis | 370/474 |
| 6,330,248 B1 | * | 12/2001 | Krishna et al. | 370/447 |
| 6,510,156 B1 | * | 1/2003 | Brock et al. | 370/395.1 |
| 6,516,003 B1 | * | 2/2003 | Nonaka et al. | 370/474 |
| 6,735,219 B1 | * | 5/2004 | Clauberg | 370/474 |

OTHER PUBLICATIONS

Enrique Hernandez-Valencia, Lucent Technologies, "Generic Framing Procedure (GFP) Specification," Oct. 9-13, 2000.*
Enrique Hernandez-Valencia, Lucent Technologies, "A Proposed Format for the GFP Type Field", T1X1.5/2000-210, pp. 1-4, Oct. 9-13, 2000.
Tim Armstrong et al., Nortel Networks—Lucent Technologies, "Transparent GFP Mappings for Fibre Channel and ESCON", T1X1.5/2000-197, pp. 1-23, Oct. 10-13, 2000.
Enrique Hernandez-Valencia, Lucent Technologies, "Generic Framing Procedure (GFP) Specification", T1X1.5/2000-209, pp. i-20, Oct. 9-13, 2000.

(Continued)

*Primary Examiner*—Seema S. Rao
*Assistant Examiner*—Shick Hom
(74) *Attorney, Agent, or Firm*—McGinn IP Law Group, PLLC

(57) ABSTRACT

To allow performance monitoring of the end-to-end path from the Ingress node to the Egress node of the GFP network by an FCS (Frame Check Sequence) check in a GFP (Generic Frame Procedure) frame, the FCS generation target area is set in the payload field of the GFP frame, no FCS recalculation is performed at the relay node and the GFP frame is transferred to the next node with the FCS added when the GFP frame is received even if an error is detected by the FCS check.

52 Claims, 15 Drawing Sheets

OTHER PUBLICATIONS

Ludovico Prattico, Nortel Networks, "Report of the Breakout Group on Data over SONET", T1X1.5/2000-127R1, pp. 1-6, Mar. 21-24, 2000.

American National Standard for Telecommunications, "Synchronous Optical Network (SONET)—Payload Mappings", ANSI T1.105.02-1995, pp. i-21, 1995.

American National Standard for Telecommunications, Synchronous Optical Network (SONET)—Basic Description including Multiplex Structure, Rates, and Formats, ANSI T1.105-1995, pp. i-79, 1995.

Telecommunication Standardization Sector—International Telecommunication Union, Study Period 1997-2000, "Draft Recommendation G.709 for Approval", COM 15-,No..-E—Feb. 2001, pp. 1-79.

International Telecommunication Union, ITU-T—Telecommunication Standardization Sector of ITU, Network node interface for the Synchronous Digital Hierarchy (SDH), pp. i-164, Feb. 2001.

American National Standard for Telecommunications, Synchronous Optical Network (SONET)—Basic Description including Multiplex Structure, Rates and Formats, ANSI T1.105-200x, pp. i-123, Oct. 20, 2000.

* cited by examiner

OCTET #

| | |
|---|---|
| 1 | FCS <31:24> |
| 2 | FCS <23:16> |
| 3 | FCS <15:08> |
| 4 | FCS <07:00> |

OCTET TRANSMISSION ORDER ↓

BITS  8 7 6 5 4 3 2 1 →

BIT TRANSMISSION ORDER (PRIOR ART)

Fig.5

OCTET #

| | |
|---|---|
| 1 | TYPE <15:08> |
| 2 | TYPE <07:00> |
| 3 | tHEC <15:08> |
| 4 | tHEC <07:00> |
| 5 | DP<03:00> \| SP<03:00> |
| 6 | SPARE <07:00> |
| 7 | eHEC <15:08> |
| 8 | eHEC <07:00> |

OCTET TRANSMISSION ORDER ↓

BITS  8 7 6 5 4 3 2 1 →

BIT TRANSMISSION ORDER (PRIOR ART)

Fig.6

APPARATUS AND METHOD FOR GFP FRAME TRANSFER

BACKGROUND OF THE INVENTION

1. Field of the Invention

The present invention relates to a GFP (Generic Frame Procedure) frame transfer apparatus and GFP frame transfer method for transferring GFP frames, and more particularly, to a GFP frame transfer apparatus and GFP frame transfer method enabling performance monitoring of an end-to-end path in a GFP frame transfer.

2. Description of the Prior Art

With the rapid spread of the Internet, traffic of data systems such as IP (Internet Protocol) packets is expanding drastically in recent years. Realizing an efficient transfer of such data system traffic requires a network configuration and equipment designed in conformance with a conventional voice network such as a telephone network to be changed to a mode suitable for transferring data system traffic, above all, a mode suitable for transferring variable-length packets.

Conventionally, there is SONET/SDH (Synchronous Optical NETwork/Synchronous Digital Hierarchy) as a digital network for WAN (Wide Area Network). The SONET/SDH adopts a data structure suitable for accommodating voice signals, and with the expansion of data system traffic in recent years, technologies for efficient transfers of data system traffic on the SONET/SDH are under study.

One of such technologies is GFP (Generic Frame Procedure). This GFP is a general-purpose encapsulation technology or adaptation technology to accommodate variable-length packets with various protocols in an OTN (Optical Transport Network) using WDM (Wavelength Division Multiplexing) in addition to SONET/SDH. The technical content of the GFP is disclosed in a document "T1X1.5/2000-209 "Generic Framing Procedure (GFP) Specification" (hereinafter referred to as "document (1)"), by T1X1.5, one of the technical committees of the U.S.A. T1 Committee.

FIG. 1 shows a protocol stack of the GFP. The GFP consists of a GFP payload dependent sub-layer and a GFP payload independent sub-layer, and is a technology for accommodating various user protocols (user network protocols: Ethernet, HDLC, Token Ring, etc.) at edge nodes that interface with this user network and transferring these user protocols transparently.

FIG. 2 shows a basic frame format of the GFP. The GFP frame shown in FIG. 2 consists of a 4-byte core header field, a variable-length (4 to 65535 bytes) payload area field and a 4-byte FCS (Frame Check Sequencer) field.

As shown in FIG. 3, the above-described core header includes two PLI (PDU Length Indicator) fields each having two bytes and two cHECs (core Header Error Control) fields. The PLI indicates the length (number of bytes) of the above-described payload area and the cHEC indicates the result of a CRC16 calculation carried out on the PLI field and is intended for protecting integrity of the information in the core header.

As shown in FIG. 4, the payload area consists of a payload header and payload field (hereinafter simply referred to as "payload"). The payload header has a variable length of 4 to 64 bytes and the payload has a variable length of 0 to 65535 bytes. The payload in this payload area stores information to be transferred.

The FCS field is a 4-byte fixed length field shown in FIG. 5. The FCS field indicates the result of an FCS calculation (a kind of CRC32 calculation) conducted on the whole of the above-described payload area and used to protect the content of the payload area.

FIG. 6 illustrates the payload header in a GFP point-to-point frame (linear frame) (GFP frame used in a point-to-point connection (connection between two nodes)). The payload header of the linear frame has Type fields, tHEC (type Header Error Control) fields, DP (Destination Port) and SP (Source Port) as extension headers and eHEC (extension Header Error Control) fields. The Type indicates the type of a GFP frame format and the type of protocol of a higher layer of data stored in the payload field. The tHEC indicates the result of a CRC16 calculation on the Type field and is used to protect integrity of information in the Type field. The DP (destination port number) indicates one of 16 ports owned by the GFP edge node on the Egress side and indicates the output destination from the GFP edge node on the Egress side of a user packet stored in the relevant GFP frame. The SP (source port number) indicates one of 16 ports owned by the GFP edge node on the Ingress side and indicates the output destination from the GFP edge node on the Egress side of a user packet stored in the relevant GFP frame. The eHEC indicates the result of a CRC16 calculation carried out on the above-described extension header (Type and tHEC are not included) and is used to protect integrity of information in the extension header.

FIG. 7 illustrates the payload header in a GFP ring frame (GFP frame used in a ring connection). The payload header in the GFP ring frame includes Type fields, tHEC fields, a DP field, an SP field and eHEC fields as in the case of the payload header of the linear frame in FIG. 6 and further includes in its extension header (octet #5 to #20 in FIG. 7), DE (Discard Eligibility) as a Priority field and COS (Class Of Service), TTL (Time To Live) field, destination MAC (Destination Media Access Control) address (DST MAC) and source MAC (Source Media Access Control) address (SRC MAC). The above-described DE indicates priority in discarding the GFP frame. The specific method of use of COS (Class Of Service) is under study. The TTL is an 8-bit area indicating the remaining count of GFP transfers (GFP hops) and, for example, TTL=0 indicates that the GFP frame is terminated at the next GFP node. The destination MAC address is a 6-byte field indicating the address of the destination GFP node and the source MAC address is a 6-byte field indicating the address of the source GFP node.

In the GFP, the type of adaptation is specified by the Type field in the payload header and it is also possible to define information according to individual adaptations in the payload header. Adaptations assuming a point-to-point frame and ring frame are currently proposed as shown above these adaptations include features as shown below.

Point-to-point frame . . . Multiplexes streams of a plurality of user protocols at the SONET node of Ingress and transfers it to the SONET node of Egress. To identify the multiplexing of streams, port addresses (SP, DP) are provided in the payload header. Since no address information to identify the SONET nodes exists in the payload header, at the relay node routing cannot be performed in GFP frame units.

Ring frame . . . Constructs a ring similar to a shared bus on the topology of the SONET ring and provides the client with an Ethernet-like packet transfer. To provide a transfer within the ring, MAC addresses to identify SONET nodes are provided in the payload header.

The adaptation method for accommodating Gigabit Ethernet, ESCON, Fiber Channel, FICON, etc. in the above-described GFP is reported in the above document (1) and document: "T1X1.5/2000-210, A Proposed Format for the GFP Type Field, October 2000" (hereinafter referred to as "document (2)") and document "T1X1.5/2000-197, Transparent GFP Mappings For Fiber Channel and ESCON, October 2000" (hereinafter referred to as "document (3)").

As a method for carrying out performance monitoring of a path to be set between two nodes in a ring connection, a method whereby a node, which has received a GFP frame, uses an FCS field check at the end of the GFP frame may be available. FIG. 8 illustrates a conventional target area for generating an FCS. As described above, the FCS field (4 bytes) added at the end of this GFP frame is the result of an FCS calculation (a kind of CRC32 calculation) carried out on the whole payload area and as a generating function G(X) in a CRC32 calculation, the following is used:

$$G(X)=1+X+X^2+X^4+X^5+X^7+X^8+X^{10}+X^{11}+X^{12}+X^{16}+X^{22}+X^{23}+X^{26}+X^{32}$$

The fields of TTL and congestion control/priority (DE, COS) in the payload header of the ring frame are rewritten for every SONET node that terminates the GFP frame. Furthermore, in a "GFP bypass frame" that the present inventor et al. are proposing as a mode of the GFP frame in order to provide flexible routing, etc. in the GFP, some of labels in the payload header and control fields may be rewritten for every SONET node that terminates the GFP frame. That is, in many cases, in the SONET node, part of the payload header is updated and FCS recalculated. Therefore, it is possible to perform monitoring in ring units using the FCS field, but it is not possible to perform monitoring of the end-to-end path from the SONET node of Ingress to the SONET node of Egress. For example, when an error occurs in the data of the payload area, the node that has received this GFP frame can detect the error by an FCS field check, but if this node discards the GFP frame, the GFP frame and FCS are not transmitted to the subsequent nodes and it is impossible to perform performance monitoring of the above-described end-to-end path using the FCS field. Even if the node cannot discard the GFP frame containing the error, FCS is recalculated (re-created) and the GFP frame with the recalculated FCS added will be transmitted to the subsequent nodes, which causes the next node to judge the FCS check result as "correct", making it impossible to realize performance monitoring of the end-to-end path using the FCS field.

The present invention is intended to solve the above-described problems and it is an object of the present invention to provide a GFP frame transfer apparatus and GFP frame transfer method capable of providing performance monitoring of an end-to-end path using the FCS field of a GFP frame in a GFP frame transfer.

SUMMARY OF THE INVENTION

It is an object of the present invention to provide a GFP frame transfer apparatus and GFP frame transfer method capable of providing performance monitoring of an end-to-end path using the FCS field of a GFP frame in a GFP frame transfer.

The GFP frame transfer apparatus of the present invention is a GFP frame transfer apparatus that transfers a GFP (Generic Frame Procedure) frame over a GFP network and is provided with an FCS (Frame Check Sequence) generation section that generates, when a GFP frame is generated and sent by the GFP frame transfer apparatus, an FCS using the payload of the GFP frame as the generation target area and adds this to the FCS field of the GFP frame.

The GFP frame transfer apparatus in another configuration of the present invention is a GFP frame transfer apparatus that transfers a GFP (Generic Frame Procedure) frame over a GFP network and is provided with an FCS recalculation section that recalculates, when the GFP frame transfer apparatus receives a GFP frame and transfers it to the next GFP frame transfer apparatus, the FCS of the GFP frame output from the GFP frame transfer apparatus based on the extension header area of the GFP frame, a difference in the eHEC (extension Header Error Control) field before and after an update in the GFP frame transfer apparatus and FCS (Frame Check Sequence) of the GFP frame when input to the GFP frame transfer apparatus, and adds this recalculation result to the FCS field of the GFP frame.

The GFP frame transfer apparatus in a further configuration of the present invention is a GFP frame transfer apparatus that transfers a GFP (Generic Frame Procedure) frame over a GFP network and is provided with an FCS check/error notification bit setting section that carries out, when the GFP frame transfer apparatus receives a GFP frame, an error check using the FCS (Frame Check Sequence) of the GFP frame and sets, if an error is detected by this FCS check, an error notification bit in a predetermined field in the extension header area of the GFP frame.

The GFP frame transfer method of the present invention is a GFP frame transfer method for the GFP frame transfer apparatus that transfers a GFP (Generic Frame Procedure) frame over a GFP network and is provided with an FCS generating step of generating, when the GFP frame transfer apparatus generates a GFP frame and transfers it to the next GFP frame transfer apparatus, an FCS (Frame Check Sequence) using the payload field of the GFP frame as the generation target area and adding this to the FCS field of the GFP frame.

The GFP frame transfer method in another configuration of the present invention is a GFP frame transfer method for the GFP frame transfer apparatus that transfers a GFP (Generic Frame Procedure) frame over a GFP network and is provided with an FCS recalculating step of recalculating, when the GFP frame transfer apparatus receives a GFP frame and transfers it to the next GFP frame transfer apparatus, the FCS of the GFP frame output from the GFP frame transfer apparatus based on the extension header area of the GFP frame, a difference in the eHEC (extension Header Error Control) field before and after an update in the next GFP frame transfer apparatus and FCS (Frame Check Sequence) of the GFP frame when input to the GFP frame transfer apparatus, and adding this to the FCS field of the GFP frame.

The GFP frame transfer method in a further configuration of the present invention is a GFP frame transfer method for the GFP frame transfer apparatus that transfers a GFP (Generic Frame Procedure) frame over a GFP network and is provided with an FCS check/error notification bit setting step of carrying out, when the GFP frame transfer apparatus receives a GFP frame, an error check using the FCS (Frame Check Sequence) of the GFP frame and setting, if an error is detected by this FCS check, an error notification bit in a predetermined field in the extension header area of the GFP frame.

BRIEF DESCRIPTION OF THE DRAWINGS

The above-mentioned and other objects, features and advantages of this invention will become more apparent by reference to the following detailed description of the invention taken in conjunction with the accompanying drawings, wherein:

FIG. 5 illustrates a format of an FCS field of the GFP frame;

FIG. 6 illustrates a payload header in a GFP point-to-point frame;

DETAILED DESCRIPTION OF THE PREFERRED EMBODIMENTS

With reference now to the attached drawings, embodiments of the present invention will be explained in detail below.

First Embodiment

Figure 7:
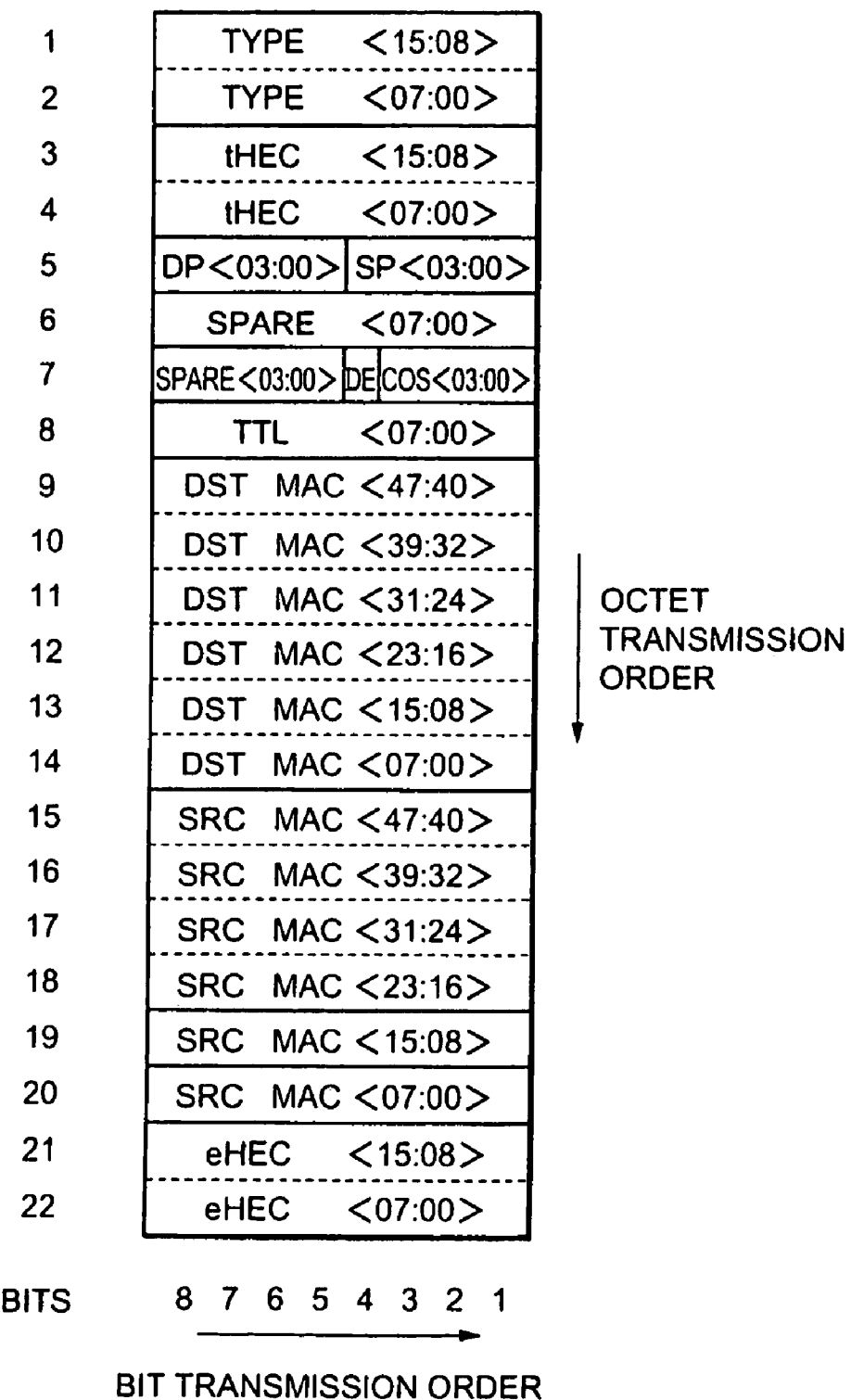
FIG. 7 illustrates a payload header of a GFP ring frame.
Figure 9:
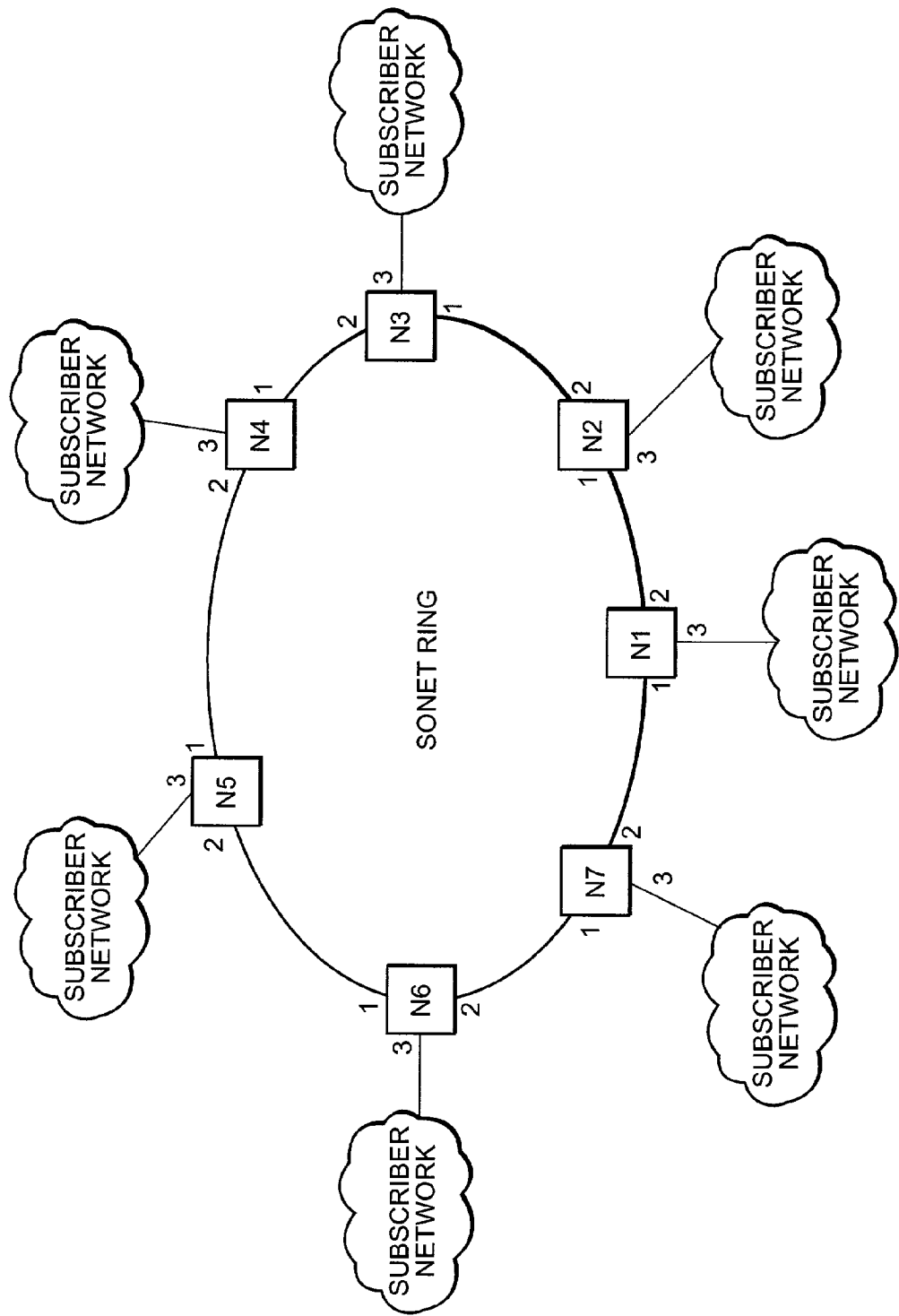
FIG. 9 is a block diagram showing an example of a GFP network made up of a GFP frame transfer apparatus according to a first embodiment of the present invention.

FIG. 9 is a block diagram showing an example of a network (called a "GFP network") made up of GFP frame transfer apparatuses according to a first embodiment of the present invention. This embodiment will be explained by taking a ring connection GFP network formed as a SONET ring as an example. For this effect, suppose a GFP ring frame having the payload header configuration shown in FIG. 7 is used as the GFP frame to be transferred within this GFP network.

According to FIG. 9, the ring-shaped GFP network in this embodiment is constructed of a plurality of GFP nodes 1 (N1, N2, ... N7) connected in a ring shape. Each GFP node 1 is connected to 1 or a plurality of subscriber networks. For simplicity, suppose each GFP node 1 is connected to and accommodates one subscriber network in the following explanations. Each GFP node 1 has a plurality of ports and each port is provided with a port number. Suppose, for example, the west side port is assigned port number "1", the east side port, port number "2" and the subscriber network side, port number "3".

Figure 10:
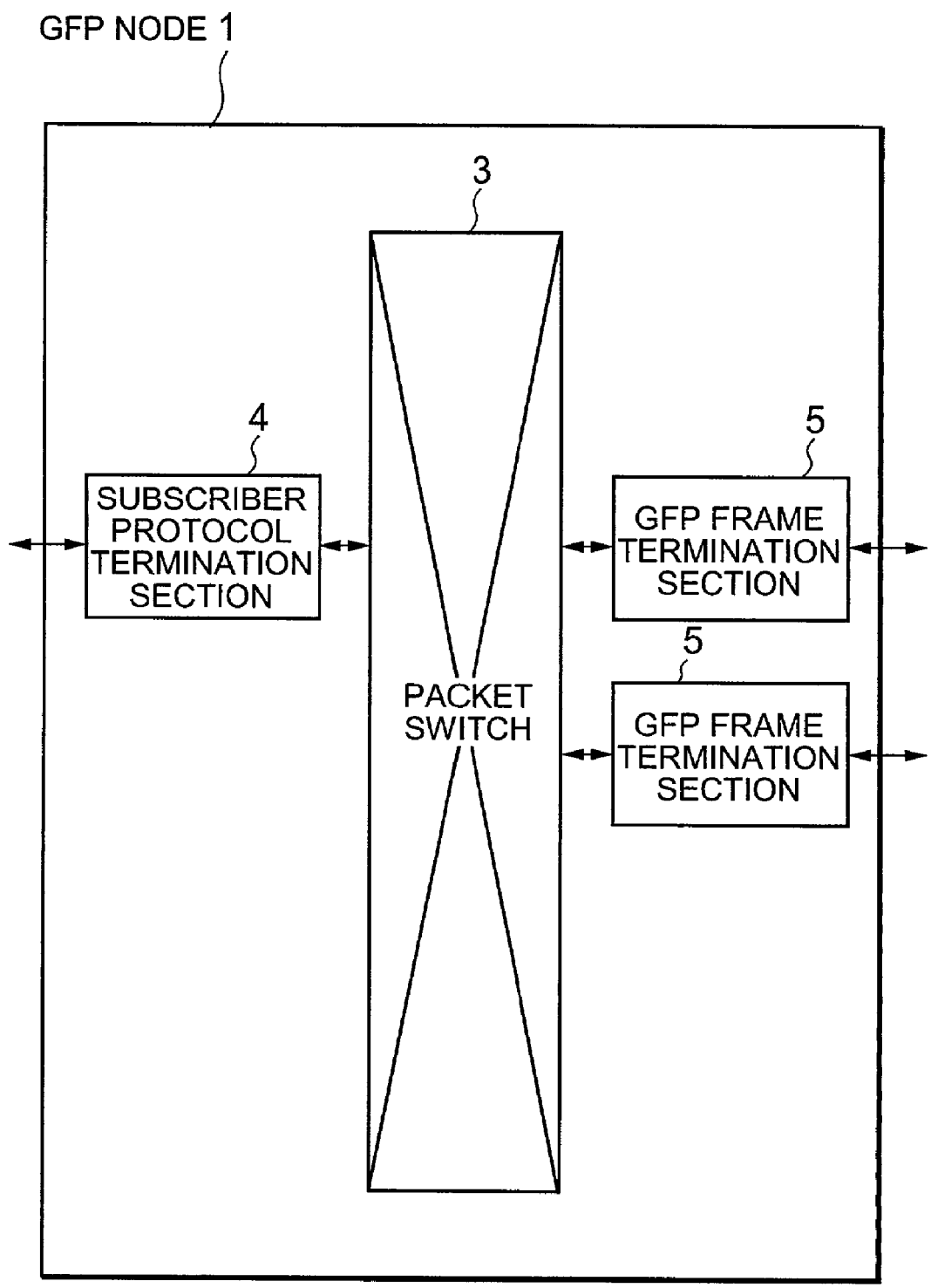
FIG. 10 is a block diagram showing an outlined configuration of the GFP frame transfer apparatus according to the first embodiment of the present invention.

FIG. 10 is a block diagram showing an outlined configuration of a GFP frame transfer apparatus according to the first embodiment of the present invention. According to FIG. 10, the GFP node 1 of the first embodiment of the present invention is constructed of one subscriber protocol termination section 4 and two GFP frame termination sections 5. Each termination section (4, 5) is mounted as, for example, a line card (LC).

The subscriber protocol termination section 4 is the part that terminates a network protocol used in the subscriber network. The configuration and function of the subscriber protocol termination section 4 are changed according to the type of the subscriber network as appropriate. For example, when it is connected to a giga-bit Ethernet (GbE), the subscriber protocol termination section 4 performs frame termination processing of the giga-bit Ethernet. Furthermore, when it is connected to a POS (Packet over SONET) network, the subscriber protocol termination section 4 performs termination processing of a SONET frame and HDLC-like frame with a point-to-point protocol stored in this SONET frame.

The GFP frame termination section 5 is the part that terminates a first layer (physical layer) of an OSI reference model that accommodates the GFP frame in the above-described GFP network. The configuration and function of the GFP frame termination section 5 are changed according to the type of the first layer of the OSI reference model of the GFP network as appropriate. For example, when SONET is used as the first layer of the OSI reference model and the GFP frame is mapped to the payload of the SONET frame (SPE (Synchronous Payload Envelope)), the GFP frame termination section 5 performs processing such as termination of the SONET frame, extraction and mapping of the GFP frame. Furthermore, an OTN (Optical Transport Network) using a WDM (Wavelength Division Multiplex) is used as the first layer of the OSI reference model and when the GFP frame is mapped to an optical channel payload unit (OPUk) which is a payload of this OTN frame (digital wrapper), the GFP frame termination section 5 performs processing such as termination of the digital wrapper frame and extraction and mapping of the GFP frame for the OPUk.

The SONET standard is described in ANSI T1.105 and ANSI T1.105.02 or ITU-T G.707, while OPUk of OTN is described in ITU-T G.709.

Figure 11:
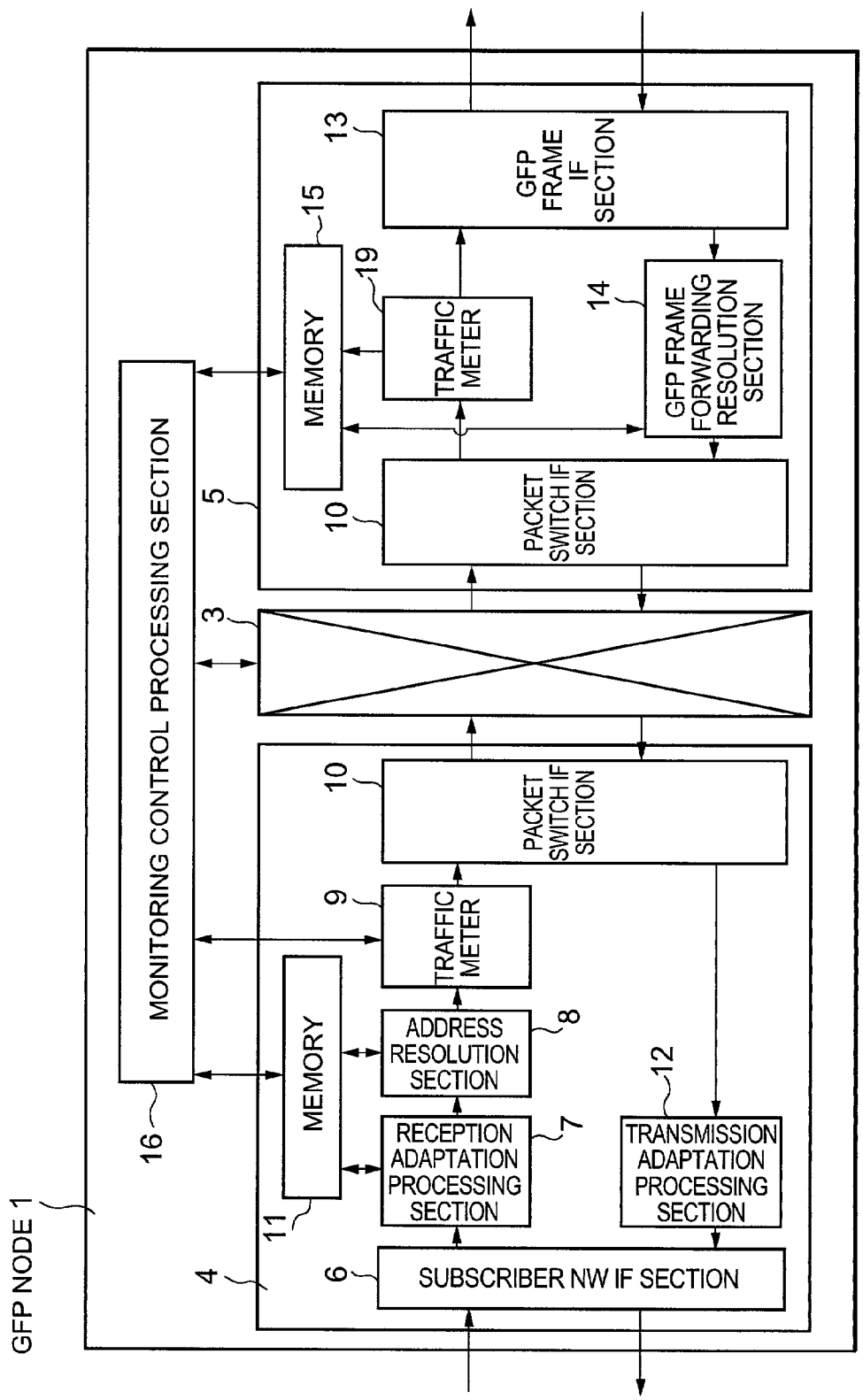
FIG. 11 is a block diagram showing an example of a detailed configuration of a GFP node in the first embodiment of the present invention.

FIG. 11 is a block diagram showing an example of a detailed configuration of GFP node 1 in the first embodiment of the present invention. The GFP node 1 includes a monitoring control processing section 16 in addition to the sections described in FIG. 10. For brevity, the GFP node 1 in FIG. 11 shows one subscriber protocol termination section 4 and one GFP frame termination section 5. However, one or more subscriber protocol termination sections 4 are provided for 1 or more subscriber network side ports of the GFP node 1 and two GFP frame termination sections 5 are provided for two GFP (ring) network side ports (East, West) and each termination section (4, 5) is connected to a packet switch 3. As described above, since this embodiment assumes that each GFP node 1 accommodates one subscriber network, this embodiment will be explained assuming that the number of the subscriber protocol termination sections 4 is one.

The subscriber protocol termination sections 4 includes a subscriber network interface section 6, a reception adaptation processing section 7, an address resolution section 8, a traffic meter 9, a packet switch interface section 10, a memory 11 and a transmission adaptation processing section 12.

The subscriber network interface section 6 transmits/receives a user packet (a subscriber network frame storing a user packet) to/from the subscriber network. When a subscriber network frame storing a user packet is received from the subscriber network, the subscriber network interface section 6 terminates this subscriber network frame, removes unnecessary overhead for the subscriber network from this subscriber network frame, extracts the user packet and sends this user packet to reception adaptation processing section 7. Furthermore, the subscriber network interface section 6 also sends a user packet to the subscriber network as will be described later.

Reception adaptation processing section 7 adds "Type" which is the field of the GFP frame for adaptation to the user packet received from the subscriber network interface section 6, performs a CRC16 calculation of this Type, adds "tHEC" and secures an area for the extension header. Hereafter, a GFP frame being formed based on the user packet will also be referred to as "GFP frame".

The address resolution section 8 refers to the memory 11 based on the destination address (User Destination Address) of the subscriber network stored in the user packet stored in the payload field of this GFP frame and identifies the destination MAC address indicating the destination node in this GFP network, output port (DP) at the destination GFP node and output port (Egress Port) of the packet switch 3 at this GFP node 1. The destination address of the subscriber network (User Destination Address) denotes the "Destination address (DA)" when, for example, the above-described user packet is an Ethernet MAC frame or IP packet extracted from the payload of the HDLC frame of POS. Furthermore, since the source MAC address (SRC MAC) indicating the source node in this GFP network and input port (SP) at the source GFP node (this GFP node 1) are the MAC address of the own node and the port number ("3" in this embodiment) corresponding to this subscriber protocol termination section 4 of the packet switch 3, these are automatically identified. Then, this DP, SP, destination MAC address (DST MAC) and source MAC address (SRC MAC) are added to the extension header area of the GFP (ring) frame and a CRC16 calculation is performed on this extension header area and to add "eHEC".

The traffic meter 9 monitors a flow of excessive traffic that exceeds a band set for each source address (User source Address) of the subscriber network stored in the user packet by the monitoring control processing section 16. As a result, if the band is exceeded, the traffic meter 9 instructs the section that controls a GFP frame read (packet switch interface section 10) to discard the GFP frame or carry out polishing control to reduce the read priority order.

The packet switch interface section 10 has the function of controlling the packet switch 3 according to the scheduling function that changes the transfer frequency depending on the amount of network resource assigned for each source address (User source Address) of the subscriber network, for example.

The memory 11 stores destination MAC address (DST MAC) indicating the destination node in the GFP network, output port (DP) at the destination GFP node and output port at the GFP node 1 (Egress Port) for each destination address (User Destination Address) of the subscriber network. This information is set from the monitoring control processing section 16.

The transmission adaptation processing section 12 removes the payload header (Type, tHEC, extension header, eHEC) from the GFP frame which is switched by the packet switch 3, transferred to the subscriber protocol termination section 4 and supplied via the packet switch interface section 10 and transfers it to the subscriber network interface section 6.

The subscriber network interface section 6 that has received the packet (hereinafter referred to as "user packet") stored in the payload of the payload area of the GFP frame from the transmission adaptation processing section 12 adds overhead for the subscriber network to this user packet, stores this in the frame of the subscriber network and sends the frame storing this user packet to the subscriber network.

On the other hand, the GFP frame termination section 5 has a GFP frame interface section 13, a GFP frame forwarding resolution section 14, a packet switch interface section 10, a traffic meter 19 and a memory 15.

The GFP frame interface section 13 transmits/receives the GFP frame (SONET frame that stores the GFP frame) to/from the GFP network. When the GFP frame interface section 13 receives the SONET frame that stores the GFP frame, the GFP frame interface section 13 extracts the GFP frame from the SONET frame, removes the core header from the GFP frame, performs descrambling processing and carries out an FCS field check, and transfers this GFP frame to the GFP frame forwarding resolution section 14. Even if an error is detected in an FCS check, the GFP frame is not discarded and the fact that an error has been detected is notified to the monitoring control processing section 16. The monitoring control processing section 16 notifies this error detection to the control system of the GFP network. Furthermore, the GFP frame is also sent to the GFP network as will be described later.

The GFP frame forwarding resolution section 14 compares the destination MAC address (Dest MAC) in the extension header of the GFP frame received from the GFP frame interface section 13 with the MAC address of the own node, and if both are different, determines the output port of the packet switch 3 so that this GFP frame is transferred to the other GFP frame termination section 5. For example, if the GFP frame termination section 5 is the GFP frame termination section 5 on the west side, the GFP frame forwarding resolution section 14 determines the output port "2" corresponding to the GFP frame termination section 5 on the east side as the output port of the packet switch 3 so that this GFP frame is transferred to the GFP frame termination section 5 on the east side. If both match, the GFP frame forwarding resolution section 14 refers to the destination port (DP) within the extension header and determines the DP as the output of the packet switch 3. In this embodiment, only one subscriber network is connected to each GFP node 1, and therefore the output destination from the packet switch 3 is fixed at one subscriber protocol termination section 4 (port "3"), but if a plurality of subscriber networks are connected to the GFP node 1, this destination port (DP) determines the subscriber network at the output destination.

The packet switch interface section 10 has almost the same function as that of the packet switch interface section 10 in the subscriber protocol termination section 4.

The memory 15 stores the MAC address of the own node and this own node MAC address is used for a comparison by the GFP frame forwarding resolution section 14. This information is set from the monitoring control processing section 16.

The traffic meter 19 monitors a flow of excessive traffic that exceeds a band set for each destination MAC address (DST MAC) by the monitoring control processing section 16. As a result, if the band is exceeded, the traffic meter 19 instructs the section that controls a GFP frame read (GFP frame interface section 13) to discard the GFP frame or carry out polishing control to reduce the read priority order.

The GFP frame interface section 13 that has received the GFP frame which is switched by the packet switch 3, transferred to the GFP frame termination section 5 and supplied via the packet switch interface section 10 and the traffic meter 19 adds the FCS field to the GFP frame as will be described later, adds the core header, performs scrambling processing, then stores this GFP frame in the payload of the SONET frame and sends the SONET frame in which this GFP frame is stored to the GFP network.

Then, an operation in the GFP node 1 according to this embodiment will be explained in detail using FIG. 11, etc.

Figure 12:
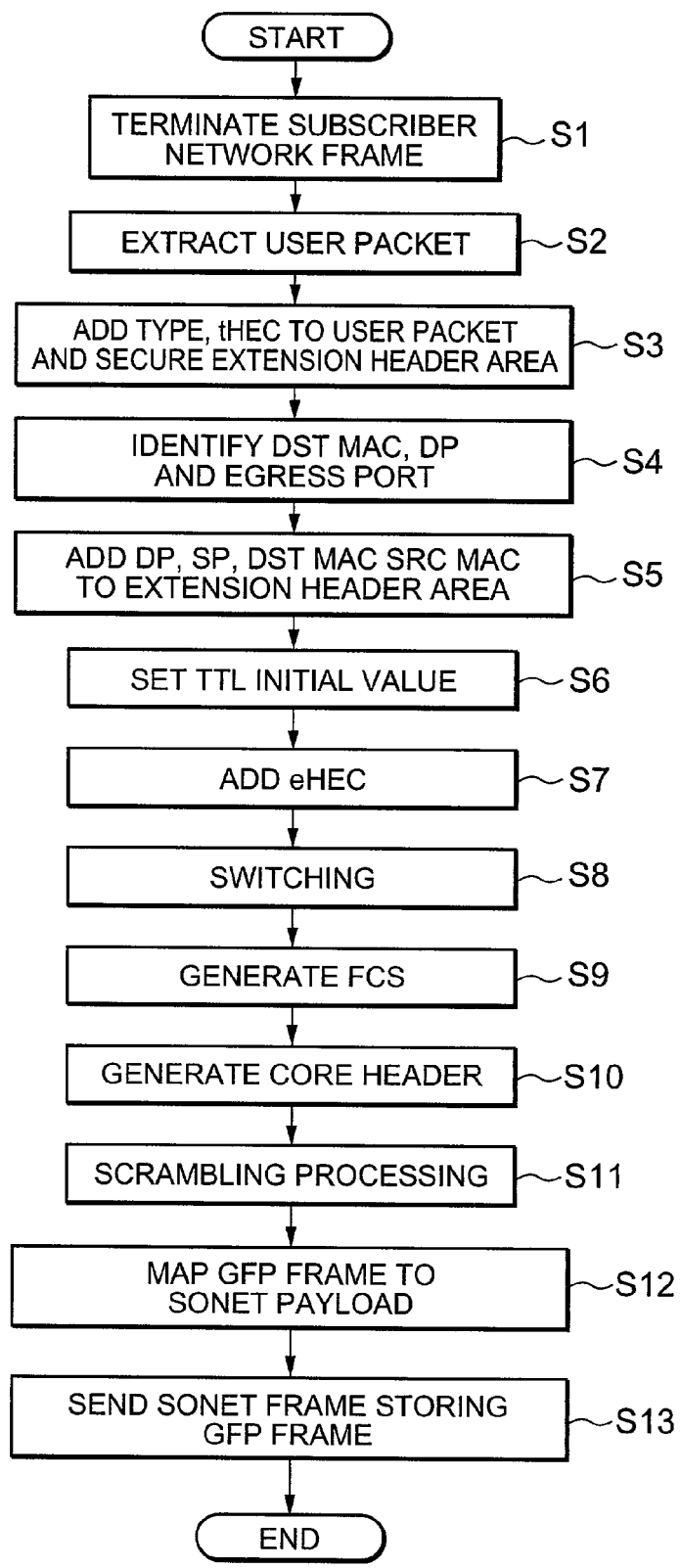
FIG. 12 is a flow chart showing a main operation of a GFP node when a user packet arrives from a subscriber network and a GFP frame in which this user packet is stored is sent to the GFP network.

First, an operation of the GFP node 1 when a user packet arrives from the subscriber network and the GFP frame storing this user packet is sent to the GFP network will be explained using FIG. 11 and FIG. 12. FIG. 12 is a flow chart showing a main operation of the GFP node 1 in the above-described case.

When a user packet (subscriber network frame storing a user packet) arrives at the subscriber protocol termination section 4 of the GFP node 1, the subscriber network interface section 6 performs termination processing on this subscriber network frame (step S1) and extracts the user packet (step S2). In this case, the subscriber network interface section 6 extracts the user packet by removing unnecessary overhead for the subscriber network from the subscriber network frame. This unnecessary overhead indicates, for example, when the subscriber network frame is an Ethernet MAC frame, its "Preamble" and "Start of Frame Delimiter".

When this user packet is transferred to the reception adaptation processing section 7, the reception adaptation processing section 7 sets a value indicating the protocol type (Ethernet, Token Ring, HDLC, etc.) of this packet or a value indicating that a ring frame will be used in the Type field of GFP, secures an area necessary for the extension header and adds it to this packet (step S3) (hereinafter a GFP frame being formed based on the user packet will also be referred to as "GFP frame").

Then, when the GFP frame is transferred to the address resolution section 8, the address resolution section 8 refers to the memory 11 based on the destination address information (User Destination Address) in the user packet stored in the payload field of this GFP frame and identifies the corresponding destination MAC address (DST MAC), destination GFP node output port (DP) and output port (Egress Port) of the packet switch 3 of the own node (step S4). Furthermore, as described above, the source MAC address (SRC MAC) and source node input port (SP) are automatically identified. Then, the address resolution section 8 adds this DP, SP, destination MAC address (DST MAC) and source MAC address (SRC MAC) to the extension header area of the GFP (ring) frame (step S5), sets a predetermined GFP transfer (GFP hops) remaining count (initial value) in the TTL field of the extension header area (step S6), performs a CRC16 calculation on this extension header area to add "eHEC" (step S7).

Then, when the GFP frame is transferred to the traffic meter 9, the traffic meter 9 monitors a flow of excessive traffic that exceeds the band set for every source address (User source Address) of the subscriber network, for example. As a result, if the band is exceeded, the traffic meter 9 instructs the packet switch interface section 10 to discard the GFP frame or perform polishing control to reduce the read priority order.

Then, when the GFP frame is transferred to the packet switch interface section 10, the packet switch interface section 10 controls the packet switch 3 according to the scheduling function to change the transfer frequency depending on the amount of network resources assigned to each source address (User source Address) of the subscriber network, for example, and transfers the GFP frame from the subscriber protocol termination section 4 to the packet switch 3.

The GFP frame is switched by the packet switch 3, transferred to the GFP frame termination section 5 (on the west side or east side corresponding to the output port of the packet switch 3 of the own node (Egress Port)) which is the switch destination (step S8). The GFP frame arrives at the traffic meter 19 via the packet switch interface section 10 inside the GFP frame termination section 5 and the traffic meter 19 performs the above-described band monitoring, flow rate restriction and priority control.

When the GFP frame is transferred to the GFP frame interface section 13, the GFP frame interface section 13 performs an FCS (Frame Check Sequence) calculation as will be described later, adds an FCS field showing the result (step S9), generates a core header (step S10), performs scrambling processing (step S11) and maps the GFP frame to the SONET payload (payload of SONET frame) used in this GFP network (step S12). Then, the SONET frame storing this GFP frame is sent from the GFP frame termination section 5 to the GFP network (step S13).

In this embodiment, suppose the GFP frame interface section 13 adds/removes the core header of the GFP frame in the GFP node 1 and the GFP frame without the core header is transferred or processed within the GFP node 1. As the method of transmitting information showing the length (delimitation) of the GFP frame within the GFP node 1, various methods can be used such as transferring a length-related numerical value added to the GFP frame (transferred multiplexed or as a different signal) as control information, adding a flag (Flag Bits) indicating the start and end of the GFP frame, sending a signal (Enable signal etc.) indicating the signal part in which the GFP frame exists in parallel, etc. It is also possible to transfer and process the GFP frame with the core header added thereto within the GFP node 1.

Figure 13:
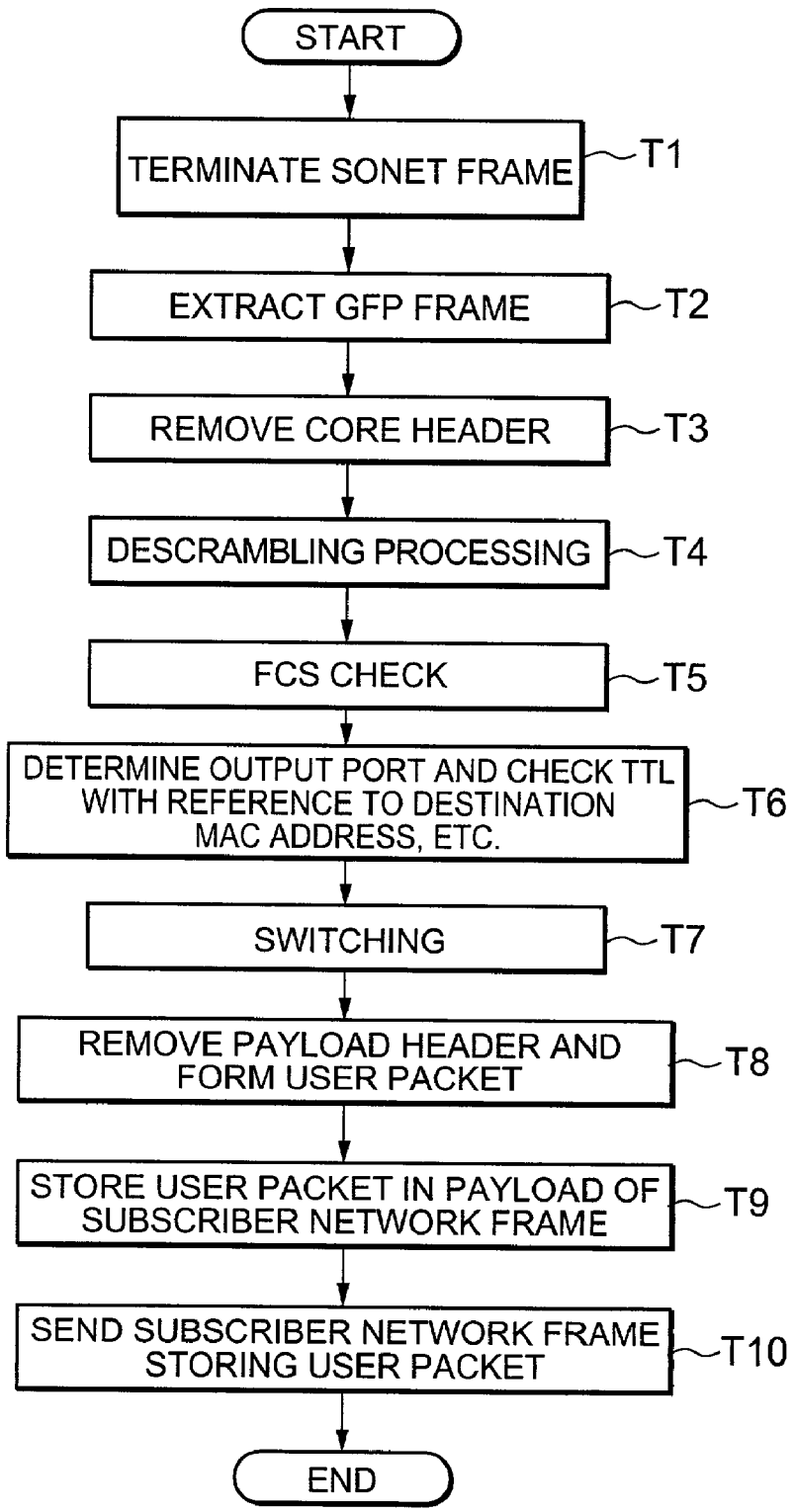
FIG. 13 is a flow chart showing a main operation of a GFP node when a GFP frame arrives from the GFP network and a user packet stored in this GFP frame is sent to a subscriber network.

Then, an operation of the GFP node 1 when the GFP frame arrives from the GFP network and the user packet stored in this is sent to the subscriber network will be explained using FIG. 11 and FIG. 13. FIG. 13 is a flowchart showing a main operation of the GFP node 1 in the above-described case.

When the GFP frame (SONET frame storing the GFP frame) arrives at the GFP frame termination section 5 on the west side or east side in the GFP node 1, the GFP frame interface section 13 in the GFP frame termination section 5 terminates the SONET frame (step T1) and extracts the GFP frame (delineation) (step T2). The GFP frame termination section 5 also removes the core header from the GFP frame (step T3), performs descrambling processing (step T4) and carries out an FCS field check for the GFP frame (FCS check) (step T5). Even if an error is detected by this FCS check, GFP frame termination section 5 does not discard the GFP frame, but notifies the fact of error detection to the monitoring control processing section 16. The monitoring control processing section 16 notifies the GFP network control system of this error detection.

When the GFP frame is transferred to the GFP frame forwarding resolution section 14, the GFP frame forwarding resolution section 14 compares the destination MAC address (DST MAC) in the extension header of the GFP frame with the MAC address of the own node and if these two are different, determines the output port of the packet switch 3 so that this GFP frame is transferred to the other (west side→east side, east side→west side) GFP frame termination section 5. In this case, when the TTL field of the GFP (ring) frame is checked and if TTL=0 is already set, this GFP frame is discarded. If TTL is 1 or greater, TTL is decremented, eHEC is recalculated and added and this GFP frame is output to the packet switch interface section 10. On the other hand, if the destination MAC address matches the MAC address of the own node, the output port of the packet switch 3 is determined as the DP with reference to the destination port (DP) in the extension header and this GFP frame is output to the packet switch interface section 10 (step T6).

Then, when the GFP frame is transferred to the packet switch interface section 10, the packet switch interface section 10 controls the packet switch 3 according to the scheduling function that changes the transfer service frequency depending on the amount of network resources assigned for each destination MAC address (DST MAC), for example, and transfers the GFP frame from the GFP frame termination section 5 to the packet switch 3.

The GFP frame is switched by the packet switch 3 and transferred to the subscriber protocol termination section 4 (step T7). In the subscriber protocol termination section 4, the GFP frame arrives at the transmission adaptation processing section 12 via the packet switch interface section 10. The transmission adaptation processing section 12 deletes the payload header (Type field, tHEC, extension header area, eHEC), forms a user packet (step T8) and transfers this user packet to the subscriber network interface section 6.

The subscriber network interface section 6 maps (addition of overhead etc.) the user packet stored in this payload field and transferred to the payload of the subscriber network frame (step T9). Then, the subscriber network frame storing this user packet is sent from the subscriber protocol termination section 4 to the subscriber network connected thereto (step T10).

Then, an operation of the GFP node 1 when the GFP frame arrives from the GFP network or the GFP frame is sent to the GFP network (when the GFP frame arrives on the west side or east side of the GFP node 1 and is sent to the opposite side (east side or west side)) will be explained.

When the GFP frame (SONET frame storing the GFP frame) arrives at the GFP frame termination section 5 on the west side or east side in the GFP node 1, the GFP frame interface section 13 in the GFP frame termination section 5 terminates the SONET frame and extracts the GFP frame (delineation). It also removes the core header from the GFP frame, performs descrambling processing and carries out a GFP frame FCS check.

Then, the same processing as that of the GFP frame termination section 5 in the above-described case of GFP frame reception is performed and this GFP frame is switched by the packet switch 3 and transferred to the other GFP frame termination section 5 corresponding to the output destination port (Egress Port).

The GFP frame termination section 5 at the switching destination then carries out almost the same processing as that of the GFP frame termination section 5 in the above-described case of GFP frame transmission and this GFP frame (SONET frame storing the GFP frame) is sent to the GFP network. The processing related to the FCS field in this case will be performed as will be described later.

Figure 14:
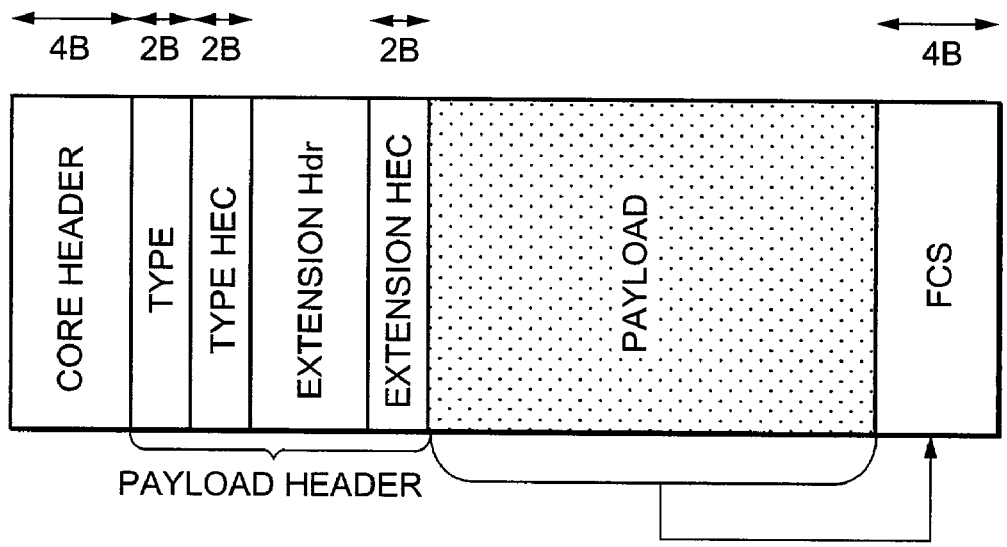
FIG. 14 illustrates an FCS generation target area according to the first embodiment of the present invention.

FIG. 14 illustrates the target area when the GFP frame interface section 13 in the GFP frame termination section 5 according to the first embodiment of the present invention checks/generates an FCS field.

Figure 8:
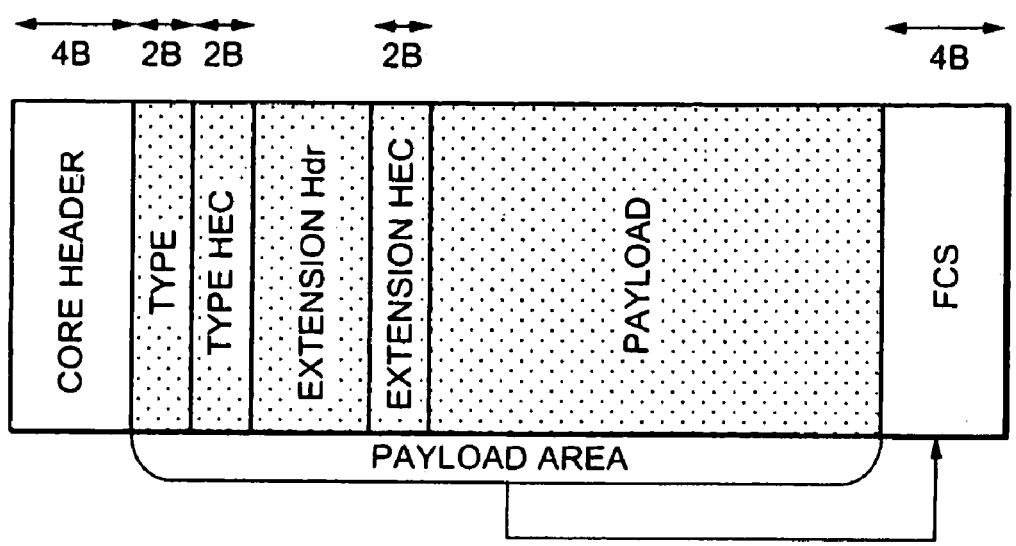
FIG. 8 illustrates a conventional FCS generation target area.

The target area for a conventional FCS calculation (generation) corresponds to the entire payload area of the GFP frame as shown in FIG. 8, while in this first embodiment, the target area corresponds to the payload (field) part which is the payload area without the payload header.

In each GFP node 1 that terminates and relays the GFP frame, the content of the payload field is not changed. Therefore, in this first embodiment in which the payload is considered as the FCS generation target area, it is not necessary to recalculate this FCS for every link. Thus, in the operation of the GFP node 1 when the GFP frame arrives from the GFP network and the GFP frame is sent to the GFP network, the GFP frame interface section 13 in the GFP frame termination section 5 on the GFP frame transmitting side carries out no FCS recalculation and sends this GFP frame with the same FCS added when the GFP frame arrived at the GFP node 1. If the GFP frame interface section 13 recalculates the FCS, even if there is mismatch between the payload area and FCS field when the GFP frame arrives, an FCS recalculation solves this mismatch and the FCS check result will be regarded as "correct" in the subsequent GFP nodes 1, and it is not possible to perform performance monitoring of the end-to-end path using the FCS field. For this reason, even if a mismatch occurs between the payload area and FCS field due to an error and the FCS check results in an error, this first embodiment does not perform any FCS recalculation, but transfers the GFP frame up to the Egress node.

Figure 15:
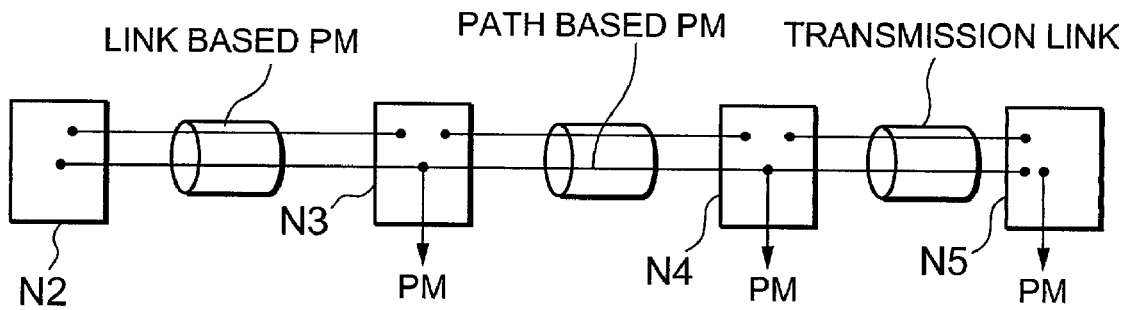
FIG. 15 is a schematic view showing performance monitoring of an end-to-end path using the FCS field in the first embodiment of the present invention.

FIG. 15 is a schematic view showing performance monitoring of an end-to-end path using the FCS field in the first embodiment of the present invention. FIG. 15 shows part of the ring-shaped GFP network shown in FIG. 9 and shows an example of transfer of the GFP frame when the GFP node N2 in FIG. 9 is regarded as the Ingress node of this GFP network and the GFP node N5 is regarded as the Egress node of this GFP network.

As shown in FIG. 15, performance monitoring (PM) by an FCS check is performed at each GFP node for every link. As described above, no FCS recalculation is performed at intermediate nodes. This makes it possible to detect deterioration/error generated on the path between the Ingress node and Egress node by an FCS check at the Egress node.

As shown above, the GFP frame transfer apparatus and GFP frame transfer method in the first embodiment of the present invention sets the FCS generation target area in the payload field of the payload area and performs no FCS recalculation when the GFP frame is received from the GFP network and sent to the GFP network. For this reason, if an error occurs on the path, the error is detected by an FCS check at the Egress node and this makes it possible to realize performance monitoring of the end-to-end path using the FCS field.

Furthermore, the monitoring control processing section 16 of the GFP node 1 that has detected an error by an FCS check notifies the error detection to the control system of the GFP network, and can thereby easily identify the error location in the path.

Second Embodiment

Then, a second embodiment of the present invention will be explained.

This second embodiment uses the conventional FCS generation target area without changing it as the FCS generation target area and adopts a different calculation method as the FCS recalculation method. It carries out FCS generation (calculation) at the GFP node 1 of Ingress and an FCS check at the intermediate GFP node 1 and GFP node 1 of Egress according to the conventional specification. On the other hand, when an FCS is recalculated at the intermediate GFP node 1, this embodiment uses the changed difference of the payload header and original FCS to calculate a new FCS.

Figure 16:
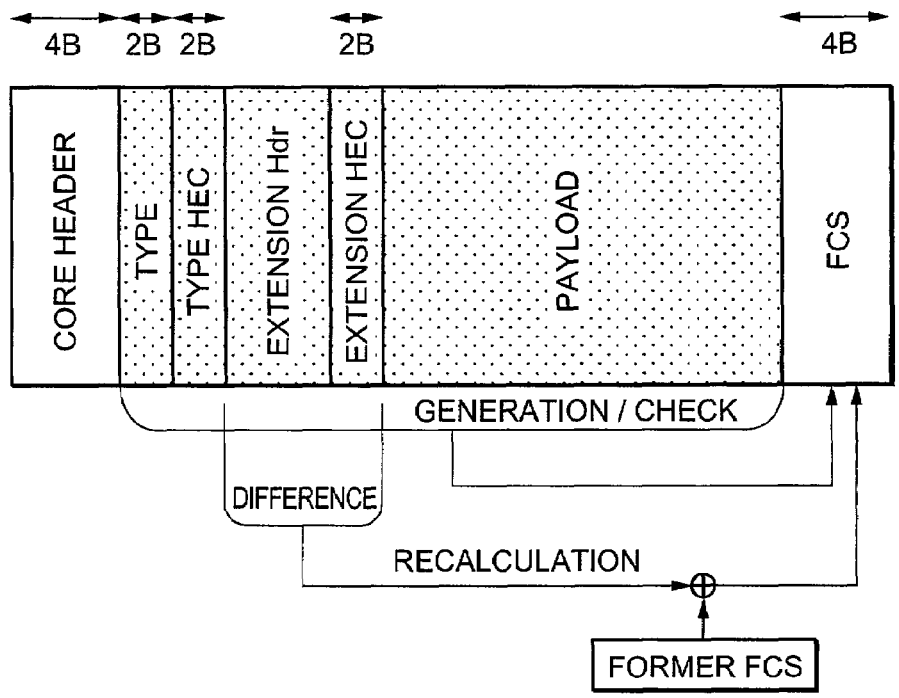
FIG. 16 illustrates an outline of an FCS recalculation method according to a second embodiment of the present invention.

The second embodiment calculates a difference between the original (when the GFP node 1 is input) payload header and new (when the GFP node 1 is output) payload header and performs a division by a generating function $G(x)$ of CRC32 calculation with respect to this difference. The exclusive OR between the remainder in the division result and original FCS becomes a new FCS (see FIG. 16).

The FCS generation method by the GFP frame interface section 13 and recalculation method when the GFP frame termination section 5 of the GFP node 1 sends a GFP frame will be explained in detail below. In the following explanations, all mathematical expressions correspond to operations using modulo2 and in operations using modulo2, a subtraction is equivalent to an addition.

The following expression is used to generate an FCS.

Information polynomial $F(x)$: An expression that expresses k-bit information of the FCS generation target area with a (k−1) order polynomial of x and is expressed as:

$$F(x)=c_1+c_2x+c_3x^2+\ldots+c_kx^{k-1}$$

In the FCS generation target area, the first bit to be sent is coefficient $c_k$ of the highest order ((k−1) order) term and the last bit to be sent is coefficient $c_1$ of the lowest order (0 order) term.

By the way, in the GFP, SONET sends information to the transmission path in Network Byte Order (Most Significant Octet first) MSB-first. Thus, in the case of the second embodiment where the FCS calculation target is the entire payload area (from the next octet of cHEC of the core header to the final octet of the payload), the MSB of the Type field is coefficient $c_k$ of the highest order $(x^{k-1})$ of $F(x)$ and the LSB of the final octet of the payload is coefficient $c_1$ of the lowest order $(x^0)$.

Generating function $G(x)$: For FCS generation, the following generating function is used as the generating function of CRC32:

$$G(x)=1+x+x^2+x^4+x^5+x^7+x^8+x^{10}+x^{11}+x^{12}+x^{16}+x^{22}+x^{23}+x^{26}+x^{32}$$

Of the coefficients of the respective terms, the coefficients of the order 0, order 1, order 2, order 4, order 5, order 7, order 8, order 10, order 11, order 12, order 16, order 22, order 23, order 26 and order 32 are 1 and the coefficients of other orders are 0.

Inversion polynomial $L(x)$: A 31-order polynomial with all coefficients being 1:

$$L(x)=1+x+x^2+\ldots x^{31}$$

is used for bit inversion.

The FCS is calculated by expressing a sum of two expressions (values) in 32 bits and taking its 1's complement.

1) Remainder when dividing $x^{32}F(x)$ ((k+31) order expression) by $G(x)$ (the order is 31 or lower)
2) Remainder when dividing $x^kL(x)$ ((k+31) order expression) by $G(x)$ (the order is 31 or lower)

Suppose the quotient when dividing $x^{32}F(x)+x^kL(x)$ by $G(x)$ is $Q(x)$ and the remainder is $R(x)$, $$x^{32}F(x)+x^kL(x)=G(x)Q(x)+R(x)$$

Therefore, $$FCS=\sim R(x) \text{ (1's complement of } R(x) \text{ (bit inversion))}= R(x)+L(x)=x^{32}F(x)+x^kL(x)-G(x)Q(x)+L(x)=x^{32}F(x)+x^kL(x)+G(x)Q(x)+L(x) \quad (1)$$

In a transfer of the GFP frame, coefficients $c_1$, $c_2$, $c_3$, ..., $c_k$ of $F(x)$ are sent sequentially starting with the coefficient with the highest order (in order of $c_k$, $c_{k-1}$, ... $c_2$, $c_1$) followed by the coefficients of the FCS starting with the highest order.

That is, $$x^{32}F(x)+FCS=x^{32}F(x)+\sim R(x)$$

is transferred.

Figure 17:
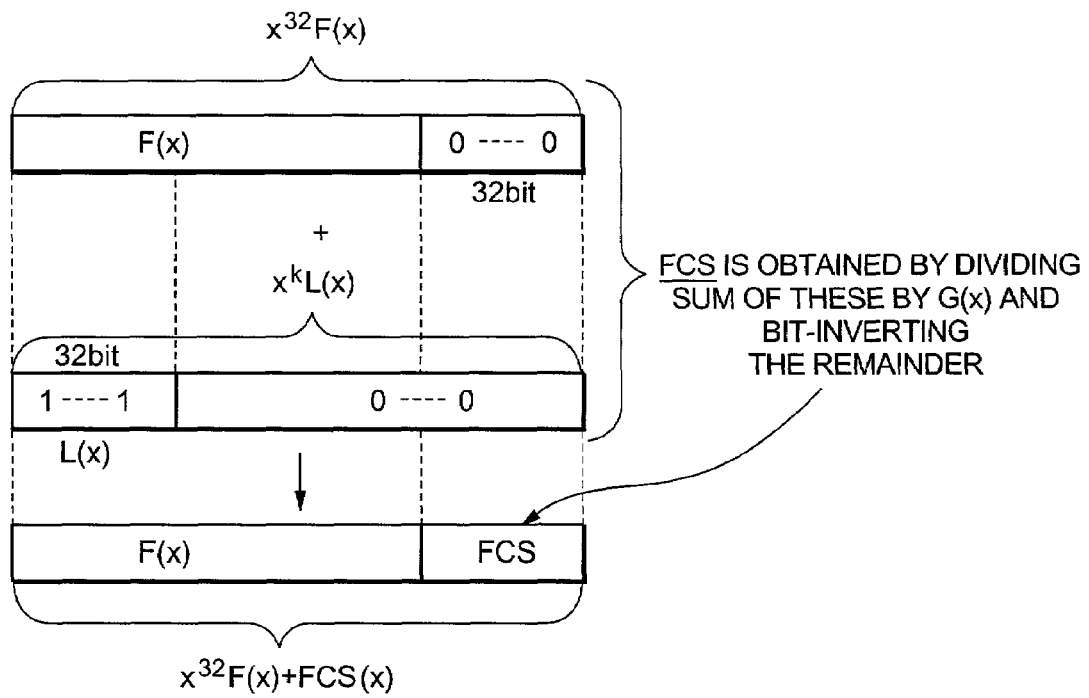
FIG. 17 is a schematic view showing generation of an FCS using an information polynomial F(x) showing the content of the FCS generation target area of the GFP frame and inversion polynomial L(x)

FIG. 17 shows a schematic view of generation of the FCS using the information polynomial $F(x)$ that expresses the content of the FCS generation target area of the GFP frame and inversion polynomial $L(x)$.

Figure 18:
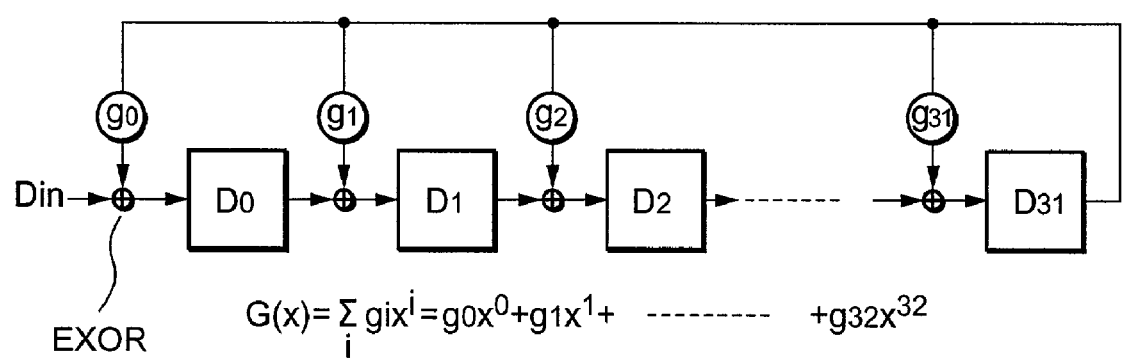
FIG. 18 is a circuit diagram showing a CRC operation circuit used in an FCS calculations.

In an actual calculation of the FCS, the CRC operation circuit shown in FIG. 18 is used. This CRC operation circuit is constructed of 32 remainder registers (D-FF) $D_0$ to $D_{31}$ and of coefficient gi of each order i of the generating function $G(x)$, and feedback is provided only for the part corresponding to coefficient gi which is 1. That is, of the part gi in FIG. 18, only the part whose corresponding coefficient gi is 1 is connected and the part whose corresponding coefficient gi is 0 is not connected. The generating function $G(x)$ is generally invariable and therefore each part gi can be provided with fixed wiring. In the CRC operation circuit in FIG. 18, each EXOR circuit performs an operation equivalent to an addition of expressions, and by feedback of each coefficient gi of the generating function $G(x)$, an operation corresponding to a division by the generating function $G(x)$ is performed.

At the start of the calculation, all remainder registers $D_0$ to $D_{31}$ of the CRC operation circuit in FIG. 18 are preset to 1 and information bit $(x^{32}F(x))$ is input to this. After all bits are input, when the next clock is input, bit-inverted outputs of the remainder registers $D_0$ to $D_{31}$ become FCS. The above-described $x^kL(x)$ is equivalent to presetting all 32-bit remainder registers to 1 in the initial state when the calculation is started and an addition of $L(x)$ is equivalent to bit inversion of the lower 32 bits.

An FCS check is performed using the CRC operation circuit in FIG. 18 as follows. When x32F(x)+FCS is input to the CRC operation circuit with all remainder registers $D_0$ to $D_{31}$ of the CRC operation circuit in FIG. 18 preset to 1, all remainder registers $D_0$ to $D_{31}$ become 1 at the next clock input after the final bit is input if no error occurs. Because, $$x^{32}F(x)+FCS+x^kL(x)=G(x)Q(x)+R(x)+FCS=G(x)Q(x)+R(x)+R(x)+L(x)=G(x)Q(x)+L(x)$$

and, if the remainder obtained by dividing $x^{32}F(x)+FCS+x^kL(x)$ by $G(x)$ is $L(x)$, all remainder registers $D_0$ to $D_{31}$ become 1 in the above-described input result. If all remainder registers $D_0$ to $D_{31}$ do not become 1 in the above-described input result, this means that an error has been detected.

An FCS recalculation at an intermediate node is performed as follows.

Suppose $F'(x)$ is an information polynomial that expresses the content of the new FCS generation target area of the GFP frame at the intermediate node and FCSnew is a new FCS. Suppose the quotient obtained by dividing $x^{32}F'(x)+x^kL(x)$ by $G(x)$ is $Q'(x)$ and the remainder is $R'(x)$ (the order is 31 or lower). In a normal FCS recalculation method, FCSnew is calculated by dividing $x^{32}F'(x)+x^kL(x)$ by $G(x)$ and taking 1's complement of the remainder $R'(x)$ according to the definition.

$$x^{32}F'(x)+x^kL(x)=G(x)Q'(x)+R'(x)FCSnew=\sim R'(x)(=R'(x)+L(x))=x^{32}F'(x)+x^kL(x)+G(x)Q'(x)+L(x) \quad (2)$$

At this time, the following expression is set up from expressions (1) and (2).

$$FCSnew=FCS+\{x^{32}F'(x)-x^{32}F(x)\}+G(x)\{Q'(x)-Q(x)\} \quad (3)$$

Expression (3) above can be proven as follows (in the following expressions, "≡" means "defines").
From the definition of FCS and FCSnew, $$FCSnew \equiv R'(x)+L(x)$$

and $$FCS \equiv R(x)+L(x)$$

Subtracting the second expression from the first expression gives:

$$FCSnew-FCS=R'(x)-R(x) \therefore FCSnew=FCS+R'(x)-R(x)$$

Here, from the definition of $Q(x)$, $R(x)$, $Q'(x)$ and $R'(x)$ $$x^{32}F(x)+x^kL(x) \equiv G(x)Q(x)+R(x)$$

$$x^{32}F'(x)+x^kL(x) \equiv G(x)Q'(x)+R'(x)$$

However, $$R'(x)-R(x)=x^{32}F'(x)+G(x)Q'(x)-\{x^{32}F(x)+G(x)Q(x)\}=\{x^{32}F'(x)-x^{32}F(x)\}+G(x)\{Q'(x)-Q(x)\} \therefore FCSnew=FCS+\{x^{32}F'(x)-x^{32}F(x)\}+G(x)\{Q'(x)-Q(x)\} \quad (3)$$

Here, since $R(x)$, $R'(x)$ are both order 31 or lower, $$\{x^{32}F'(x)-x^{32}F(x)\}+G(x)\{Q'(x)-Q(x)\}$$

is also order 31 or lower, and so $$\{x^{32}F'(x)-x^{32}F(x)\}+G(x)\{Q'(x)-Q(x)\}$$

is equivalent to the remainder obtained by dividing $x^{32}F'(x)-x^{32}F(x)$ by $G(x)$.

That is, the new FCS is calculated by adding the original FCS to the remainder obtained by dividing the information polynomial that expresses a difference between the new information and original information at the intermediate node $\{x^{32}F'(x)-x^{32}F(x)\}$ by $G(x)$.

According to this new calculation method, processing like presetting all 32-bit remainder registers $D_0$ to $D_{31}$ to 1 or bit inversion of the lower 32 bits is not necessary in the division by $G(x)$.

Figure 19:
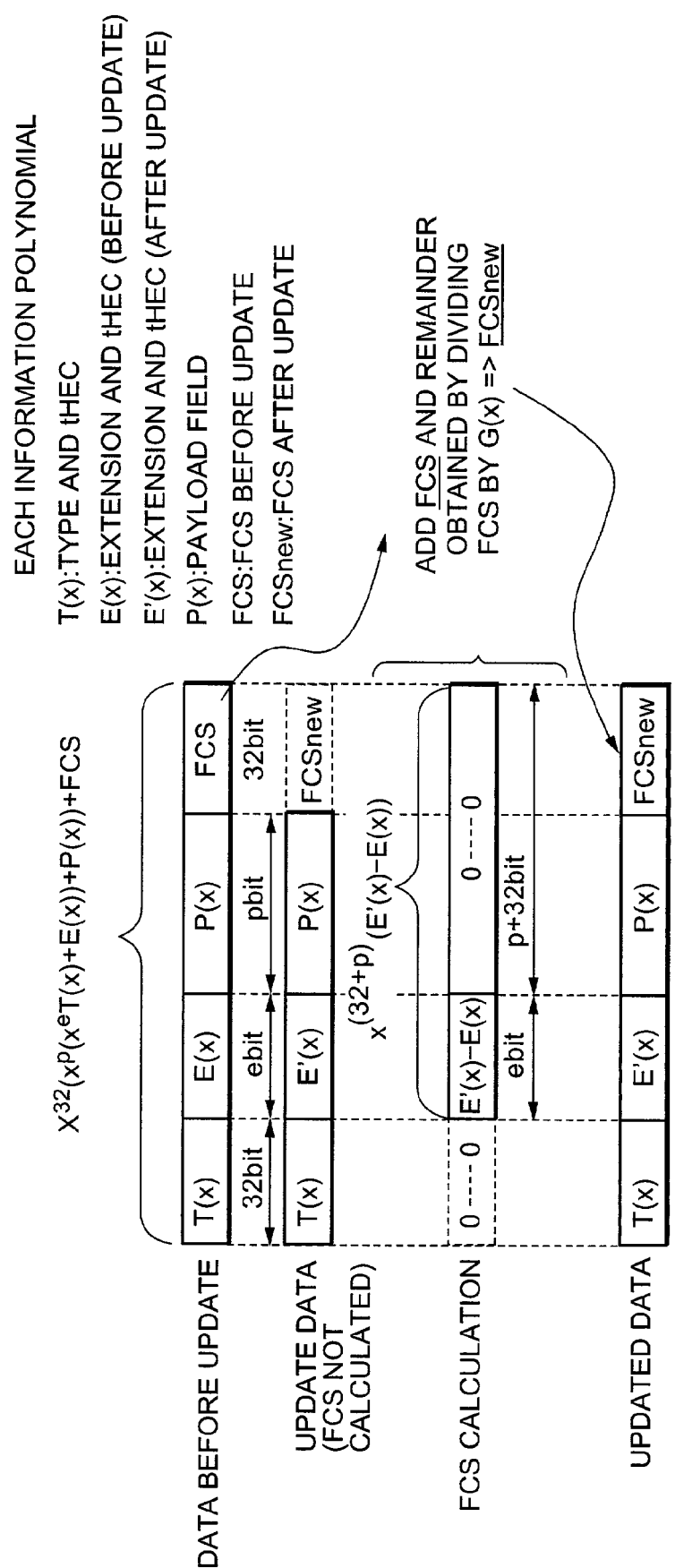
FIG. 19 illustrates an FCS recalculation method according to the second embodiment of the present invention.

In an inter-node transfer of the GFP frame, the content of the payload field in which the higher protocol data is stored does not change, and therefore the difference between the new information and original information corresponds to the extension header area and the eHEC section. Therefore, suppose the information polynomial of the extension header area and the eHEC section before an update is $E(x)$ and after an update is $E'(x)$ and the number of bits of the payload field is p. Then, as shown in FIG. 19, the sum of the remainder obtained by dividing $x^{32}F'(x)-x^{32}F(x)=x^{32+p}\{E'(x)-E(x)\}$ by $G(x)$ and the original FCS becomes a new FCS (FCSnew).

At this time, the division by $G(x)$ does not require:
(1) Processing of presetting all 32-bit remainder registers to 1
(2) Processing of bit inversion of lower 32 bits Thus, a new FCS (FCSnew) is obtained by initializing all remainder registers to "0", entering the bit string of $E'(x)-E(x)$ and entering "0" for the 32 bits in the CRC operation circuit and then adding this to the original FCS.

In summary, the various FCS calculation methods are as follows.

Figure 1:
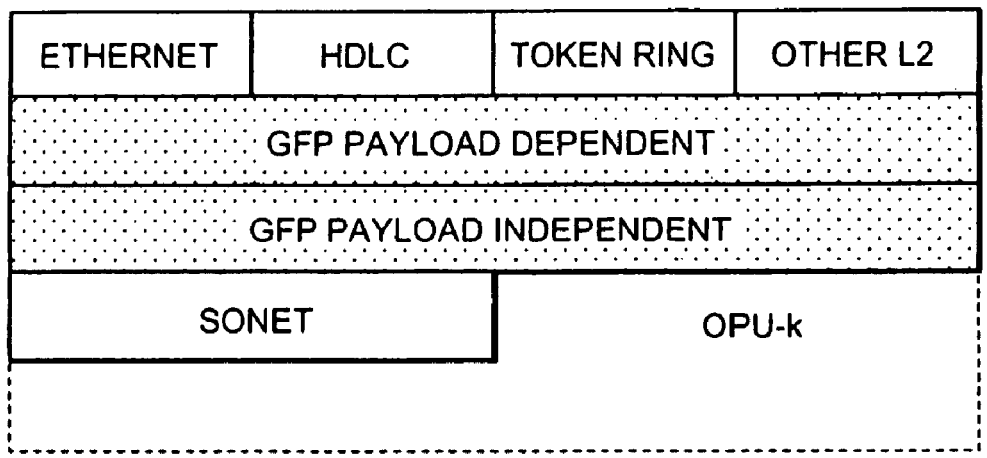
FIG. 1 illustrates a protocol stack of a GFP.
Figure 2:
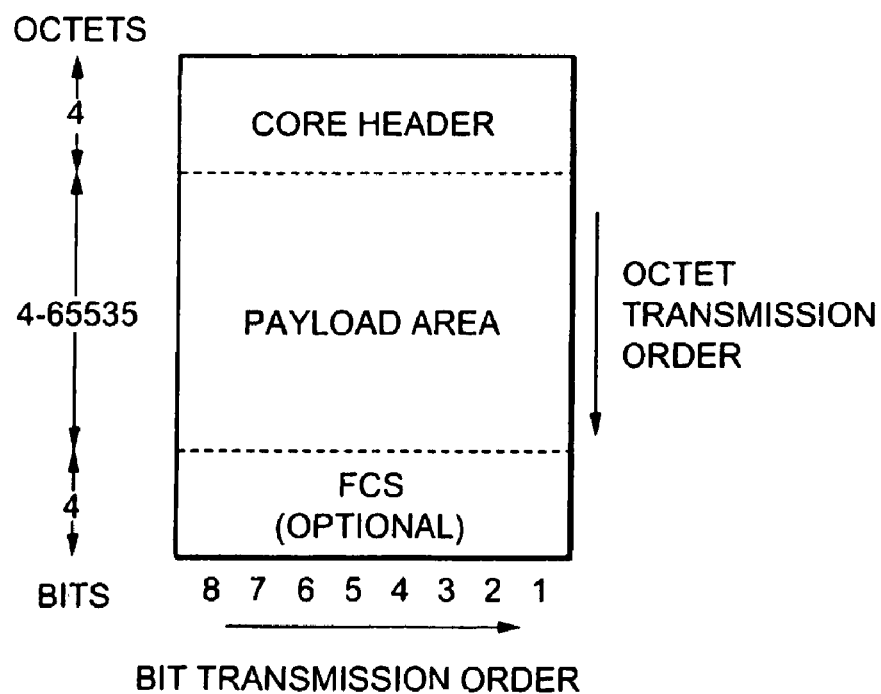
FIG. 2 illustrates a basic frame format of the GFP.
Figure 3:
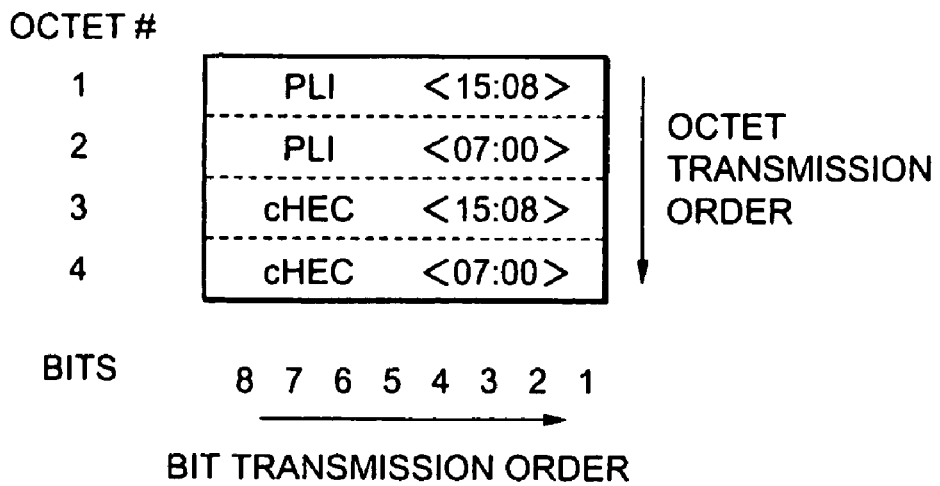
FIG. 3 illustrates a format of a core header of the GFP frame.
Figure 4:
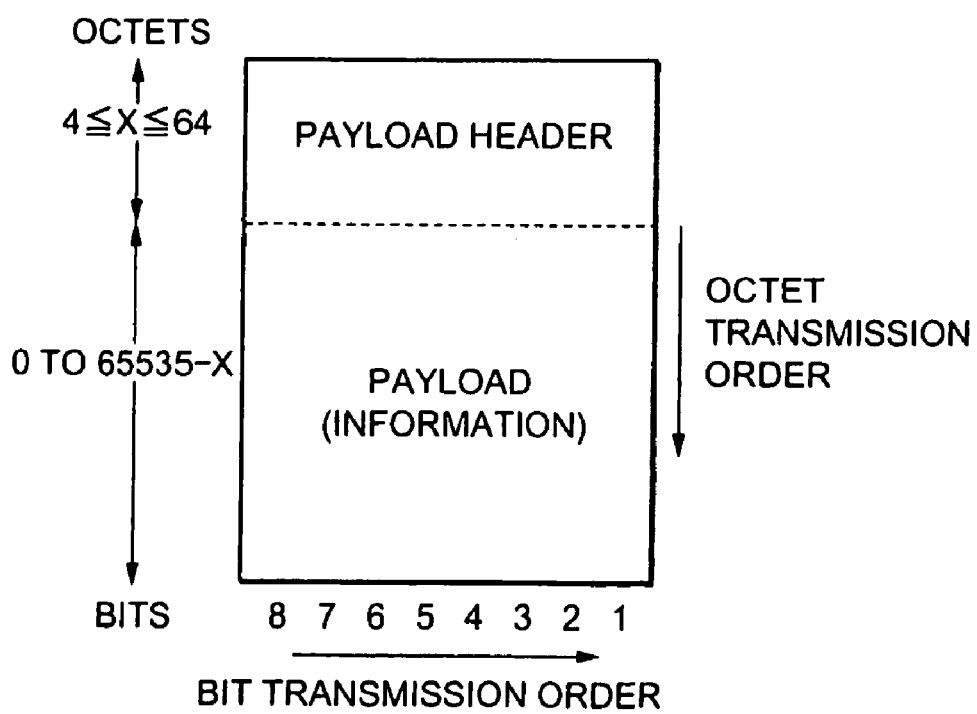
FIG. 4 illustrates a format of a payload area of the GFP frame.

[During FCS Generation]
(1) Presetting all remainder registers of the CRC operation circuit in FIG. 18 to 1
(2) Inputting from Type field of GFP frame to CRC operation circuit
(3) The bit-inverted outputs of the remainder registers are sent as FCS at the clock following the clock at which the free FCS 32 bits are input.

[During FCS Check]
(1) Presetting all remainder registers of the CRC operation circuit in FIG. 18 to 1
(2) Inputting from Type field of GFP frame to CRC operation circuit
(3) If all remainder registers are 1 at the clock following the clock at which the final bit of the FCS is input, there is no error in the payload area. If all remainder registers are other than 1, an error is detected.

[During FCS Recalculation]
(1) Initializing all remainder registers of the CRC operation circuit in FIG. 18 to 0
(2) Inputting a difference of the extension header area and eHEC before and after an update to the CRC operation circuit
(3) Adding the original FCS to the outputs of the remainder registers at the clock following the clock at which "0" is input by the number of bits (p) of the payload field+32.

Then, a new FCS (FCSnew) is generated (bit inversion is not required).

The difference of the extension header area and eHEC before and after an update during an FCS recalculation (2) above is calculated, for example, from a subtraction circuit made up of a plurality of EXOR circuits that carry out a subtraction (equivalent to an addition in a calculation by modulo2) for every bit. Furthermore, an addition of the original FCS to the outputs of the remainder registers during the FCS recalculation (3) above is carried out by an addition circuit made up of a plurality of EXOR circuits that carry out an addition for every bit.

In the second embodiment, even if an error is detected through an FCS check by the GFP frame interface section 13, the GFP frame is not discarded, but the fact of the error detection is notified to the monitoring control processing section 16. The monitoring control processing section 16 notifies the GFP network control system of this error detection.

As shown above, the GFP frame transfer apparatus and GFP frame transfer method according to the second embodiment of the present invention uses the same conventional FCS generation target area as the FCS target area and calculates a new FCS using the changed difference of the payload header and the original FCS when recalculating the FCS at the intermediate GFP node 1. Thus, when an error occurs on the path, the error is detected by an FCS check at the Egress node and this allows performance monitoring of the end-to-end path using the FCS field as in the case of the first embodiment. Furthermore, the monitoring control processing section 16 of the GFP node 1 in which an error is detected by an FCS check notifies the GFP network control system of the error, which facilitates the identification of the error location in the path. Therefore, while using a calculation method not considering the payload field which is basically not changed in each GFP node 1, this embodiment makes it possible to perform performance monitoring of an end-to-end path and identify the error location using the FCS field as in the case of the first embodiment.

Third Embodiment

Next, a third embodiment of the present invention will be explained.

Figure 20:
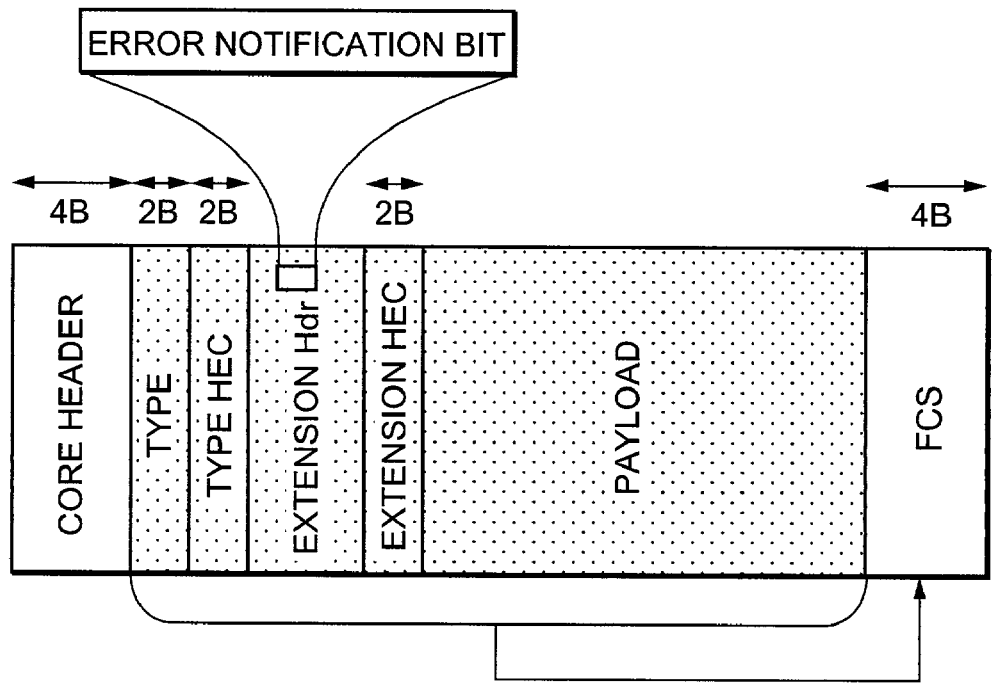
FIG. 20 illustrates an error notification bit used in a third embodiment of the present invention.

As shown in FIG. 20, as the FCS generation target area, this third embodiment uses the conventional FCS generation target area without any modification thereto and defines a new error notification bit in the payload header. This error notification bit can be defined, for example, in part of the Spare field of the payload header in the case of the GFP ring frame.

Figure 21:
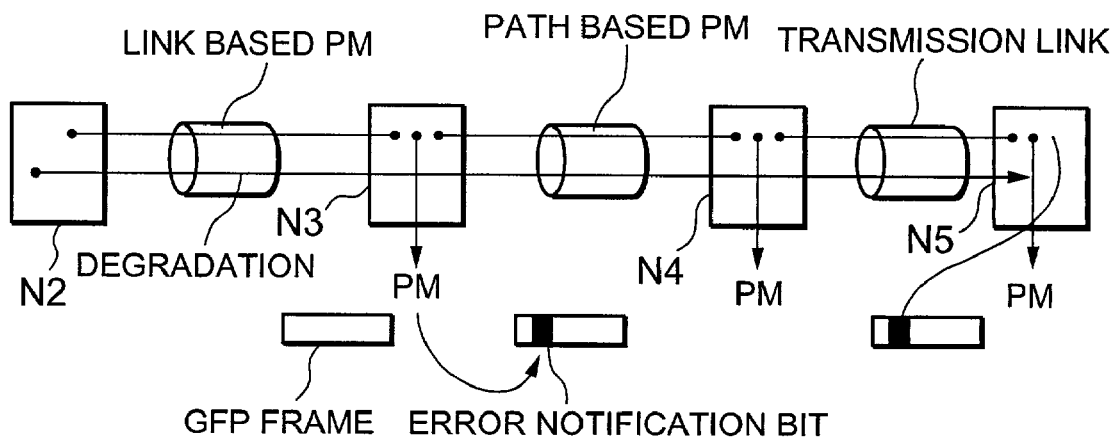
FIG. 21 is a schematic view showing performance monitoring of an end-to-end path using the FCS field and error notification bit in the third embodiment of the present invention.

FIG. 21 is a schematic view showing performance monitoring of an end-to-end path using the FCS field and error notification bit in the third embodiment of the present invention. FIG. 21 is an example of transfer of a GFP frame in part (N2→N5) of the ring-shaped GFP network in FIG. 9 as in the case of FIG. 15.

As shown in FIG. 21, when an error occurs in a GFP link and the error is detected by an FCS check at the GFP node 1 that has received this GFP frame, the GFP frame interface section 13 of the GFP frame termination section 5 of the GFP node 1 that has detected the error sets the error notification bit to 1. An FCS recalculation is performed by each GFP node 1 in GFP link units as in the case of the conventional art. Since the error notification bit in the GFP frame which arrived at the GFP node 1 on the Egress side is a logical sum of the performance monitoring results in all links in the path, the GFP node 1 on the Egress side can perform performance monitoring of the end-to-end path using the error notification bit. Furthermore, each GFP node 1 that terminates the GFP layer can detect deterioration/error (degradation) link by link through an FCS field check. Therefore, it is possible to detect all trouble on the path through this error notification bit and FCS check.

As shown above, the GFP frame transfer apparatus and GFP frame transfer method according to the third embodiment of the present invention uses as the FCS generation target area the same conventional FCS generation target area and defines a new error notification bit in the payload header. Since this embodiment performs an FCS recalculation at each GFP node 1 and sets this error notification bit at the GFP node 1 that has detected the error through an FCS check, it is possible to detect all trouble (end-to-end path performance monitoring and deterioration/error detection in link units) on the path through the error notification bit and FCS check.

The foregoing embodiments have described the GFP ring frame which is transferred on the ring-shaped connection GFP network as an example, but the foregoing embodiments are also applicable to other GFP frame formats such as "GFP path frame" which is being currently proposed by the present inventor et al. This GFP path frame is a frame compliant with the basic frame format of the GFP frame shown in FIG. 2 to FIG. 5, stores a label corresponding to a path ID defined to uniquely specify the path from the Ingress node to Egress node within the GFP network in a predetermined field of the extension header area and is routed according to this label. The GFP path frame is also available to complicated network topologies such as mesh-shaped and multi-ring-shaped topologies in addition to the ring-shaped connection GFP network and the above-described embodiments are also applicable to GFP networks in those complicated modes. Thus, it is possible, using the FCS field of the GFP path frame, to realize end-to-end path performance monitoring which is particularly important in frame transfers in the GFP network in a complicated mode.

Furthermore, the above-described embodiments assume that an FCS check is performed by each GFP node 1 on the path, but it is of course possible to perform the FCS check only at some specific intermediate nodes. FCS recalculations in the second and third embodiments need to be performed at each intermediate node because the content of the payload header is changed at each intermediate node due to a TTL rewrite etc.

As described above, according to the GFP frame transfer apparatus according to the first embodiment of the present invention, when generating and sending the GFP frame, the GFP frame transfer apparatus that transfers a GFP (Generic Frame Procedure) frame over a GFP network comprises an FCS generation section that generates an FCS (Frame Check Sequence) using the payload field of the GFP frame as the generation target area and adds this FCS to the FCS field of the GFP frame, which basically prevents the content of the payload field of the GFP frame from being changed at a relay node and thereby basically eliminates the need to recalculate the FCS for every link at each relay node, allowing each relay node to send the GFP frame with the same FCS added when the GFP frame is received without recalculating the FCS.

Furthermore, since this GFP frame transfer apparatus further comprises an FCS check section to perform an FCS check using the payload field and FCS field of the GFP frame when this GFP frame transfer apparatus receives the GFP frame, it is possible to determine whether an error has occurred or not in the GFP frame which is transferred from another GFP frame transfer apparatus. If the FCS check by the FCS check section detects an error in the GFP frame to be transferred to the next GFP frame transfer apparatus, it is desirable not to discard this GFP frame but to transfer it with the same FCS added when the error is detected to the next GFP frame transfer apparatus. By transferring the GFP frame up to the Egress node in the GFP network, it is possible to detect an error that occurs on the path between the Ingress node and Egress node through an FCS check at the Egress node and thereby realize end-to-end path performance monitoring using the FCS field.

Furthermore, since the monitoring control processing section of the GFP frame transfer apparatus which has detected an error through an FCS check notifies the GFP network control system of the error detection, it is also possible to facilitate identification of the error location in the path in addition to the above-described end-to-end path performance monitoring.

According to the GFP frame transfer apparatus according to the second embodiment, when receiving GFP frame and transferring it to the next GFP frame transfer apparatus, the GFP frame transfer apparatus comprises an FCS recalculation section that recalculates the FCS of the GFP frame output from the GFP frame transfer apparatus based on the difference of the extension header area of the GFP frame and eHEC (extension Header Error Control) field before and after an update in the GFP frame transfer apparatus and the FCS (Frame Check Sequence) of the GFP frame when input to the GFP frame transfer apparatus, and adds this FCS to the FCS field of the GFP frame, and can thereby take the difference only for the extension header area and eHEC field which may be changed at each relay node and recalculate the FCS using this difference and using the calculation method not considering the payload field which is basically not changed by each GFP frame transfer apparatus.

Furthermore, since the GFP frame transfer apparatus is further provided with an FCS check section for, when this GFP frame transfer apparatus receives the GFP frame, carrying out an FCS check using the payload area of the GFP frame and FCS field, it is possible to decide whether an error has occurred or not in the GFP frame which has been transferred from another GFP frame transfer apparatus. When the FCS check by the FCS check section detects an error in the GFP frame to be transferred to the next GFP frame transfer apparatus, it is desirable not to discard this GFP frame but to transfer it with the FCS recalculated by the FCS recalculation section to the next GFP frame transfer apparatus. By transferring the GFP frame up to the Egress node, it is possible to detect, through an FCS check at the Egress node, an error that occurs on the path between the Ingress node and Egress node and thereby realize end-to-end path performance monitoring using the FCS field.

Furthermore, since the monitoring control processing section of the GFP frame transfer apparatus which has detected an error through an FCS check notifies the GFP network control system of the error detection, it is also possible to facilitate identification of the error location in the path in addition to the above-described end-to-end path performance monitoring.

The FCS recalculation section can be implemented by a subtraction circuit that calculates a difference of the extension header area of the GFP frame and the eHEC field before and after an update in the GFP frame transfer apparatus, a CRC operation circuit that includes a plurality of remainder registers, provides feedback corresponding to the generating function G(x) of the FCS for the plurality of remainder registers and receives the above-described difference as input, and an addition circuit that calculates a sum of the outputs of the plurality of remainder registers of the CRC operation circuit and the FCS bits of the GFP frame when input to the GFP frame transfer apparatus. In this case, the FCS recalculation section recalculates FCS by calculating the above-described difference by the subtraction circuit, initializing all of the plurality of remainder registers of the CRC operation circuit to 0, inputting the above-described difference to the CRC operation circuit, inputting 0 by the number of bits of the payload field+32 to the CRC operation circuit, and adding up the outputs of the above-described plurality of remainder registers and the above-described FCS bits of the GFP frame when input to the GFP frame transfer apparatus through the addition circuit at the next clock.

According to the GFP frame transfer apparatus according to the third embodiment, when receiving a GFP frame, the GFP frame transfer apparatus comprises an FCS check/error notification bit setting section that performs an error check using the FCS (Frame Check Sequence) of the above-described GFP frame and sets an error notification bit in a predetermined field of the extension header area of the GFP frame when this FCS check detects an error, and can thereby notify the subsequent GFP frame transfer apparatuses through the error notification bit whether an error has occurred or not in the GFP frame transfer apparatus. When the FCS check by the above-described FCS check/error notification bit setting section detects an error in the GFP frame to be transferred to the next GFP frame transfer apparatus, it is desirable not to discard the GFP frame but to transfer it with the FCS recalculated by the GFP frame transfer apparatus to the next GFP frame transfer apparatus. This allows the GFP frame transfer apparatus on the Egress side to realize end-to-end path performance monitoring with reference to the error notification bit, detect deterioration/error in link units at each intermediate node through an FCS check and detect all trouble on the path through the error notification bit and FCS check.

As the above-described GFP frame, the conventional GFP ring frame can be used and in this case it is possible to provide the above-described predetermined field in which the error notification bit is set, for example, in part of the Spare field in the extension header area.

As the GFP frame, it is also possible to use the GFP path frame which stores the label corresponding to the path ID defined to uniquely specify the path from the Ingress node to Egress node in the GFP network in a predetermined field of the extension header area. This GFP path frame is a frame also available to complicated network topologies such as mesh-shaped, multi-ring-shaped topologies in addition to the ring-shaped connection GFP network and it is possible to realize end-to-end path performance monitoring which is particularly important in frame transfers in the GFP network in a complicated mode using the FCS field of the GFP path frame.

Furthermore, it is also possible to allow the above-described GFP frame transfer apparatus to accommodate a subnetwork such as Ethernet, POS (Packet Over SONET). When Ethernet is accommodated as a subnetwork, the packet extraction section of the GFP frame transfer apparatus can terminate this Ethernet frame, extract a packet from the payload of this Ethernet frame, store this packet in the payload field of the GFP frame and send to the GFP network. Furthermore, when the POS is accommodated as the subnetwork, the packet extraction section of the GFP frame transfer apparatus can terminate the HDLC frame of this POS, extract a packet from the payload of this HDLC frame, store this packet in the payload field of the GFP frame and send to the GFP network. The packet extraction section extracts the packet, for example, by removing unnecessary overhead for the subnetwork from the frame of the subnetwork.

Furthermore, when the GFP frame transmission section of the above-described GFP frame transfer apparatus sends a GFP frame to the GFP network, the GFP network can store the above-described GFP frame in the layer 1 frame which is the first layer frame of the OSI reference model that accommodates the GFP frame in the GFP network and send the layer 1 frame that stores this GFP frame from an appropriate output port of the GFP frame transfer apparatus to the GFP network. As the first layer of this OSI reference model, it is possible to use SONET (Synchronous Optical NETwork), OTN (Optical Transport Network), etc. When SONET is used as the above-described first layer, the GFP frame transmission section can store the GFP frame in the payload of the SONET frame of the SONET and send the SONET frame that stores this GFP frame to the GFP network. Furthermore, when the OTN is used as the above-described first layer, the GFP frame transmission section can store the GFP frame in the OPUk (Optical channel payload unit) which is the payload of the digital wrapper frame of the OTN and send the digital wrapper frame that stores this GFP frame to the GFP network. Furthermore, each GFP frame transfer method of the present invention can also obtain an effect similar to the effect of each GFP frame transfer apparatus of the present invention described above.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

The invention claimed is:

1. A GFP frame transfer apparatus for transferring a GFP (Generic Frame Procedure) frame over a GFP network, comprising an FCS generation section that generates, when said GFP frame is generated and sent by said GFP frame transfer apparatus, an FCS (Frame Check Sequence) using a payload field, without a payload header, of said GFP frame as a generation target area and adds this FCS to an FCS field of said GFP frame.

2. The GFP frame transfer apparatus according to claim 1, further comprising an FCS check section that carries out, when said GFP frame transfer apparatus receives said GFP frame, an FCS check using said payload field and said FCS field of said GFP frame.

3. The GFP frame transfer apparatus according to claim 2, wherein when said FCS check by said FCS check section detects an error of the GFP frame to be transferred to a next GFP frame transfer apparatus, said GFP frame is not discarded, but transferred to the next GFP frame transfer apparatus with a same FCS added when said error is detected.

4. The GFP frame transfer apparatus according to claim 2, further comprising a monitoring control processing section that is notified, when said FCS check by said FCS check section detects an error, of this error detection from said FCS check section and notifies this error detection to a control system of said GFP network.

5. A GFP frame transfer apparatus for transferring a GFP (Generic Frame Procedure) frame over a GFP network, comprising an FCS recalculation section that recalculates, when said GFP frame transfer apparatus receives said GFP frame and transfers to a next GFP frame transfer apparatus, the FCS of said GFP frame output from said GFP frame transfer apparatus based on a difference of an extension header area of said GFP frame and an eHEC (extension Header Error Control) field before and after an update in said GFP frame transfer apparatus and the FCS (Frame Check Sequence) of said GFP frame when input to said GFP frame transfer apparatus, and adds this FCS to an FCS field of said GFP frame.

6. The GFP frame transfer apparatus according to claim 5, further comprising an FCS check section that carries out, when said GFP frame transfer apparatus receives said GFP frame, an FCS check using said payload area and said FCS field of said GFP frame.

7. The GFP frame transfer apparatus according to claim 6, wherein when said FCS check by said FCS check section detects an error of the GFP frame to be transferred to the next GFP frame transfer apparatus, said GFP frame is not discarded, but transferred to said next GFP frame transfer apparatus with said FCS recalculated by said FCS recalculation section added.

8. The GFP frame transfer apparatus according to claim 6, further comprising a monitoring control processing section that is notified, when said FCS check by said FCS check section detects an error, of this error detection from said FCS check section and notifies this error detection to a control system of said GFP network.

9. The GFP frame transfer apparatus according to claim 5, wherein said FCS recalculation section comprises:
a subtraction circuit that calculates a difference of said extension header area of said GFP frame and said eHEC field before and after an update in said GFP frame transfer apparatus;
a CRC operation circuit that includes a plurality of remainder registers, provides a feedback corresponding to a generating function G(x) of said FCS for said plurality of remainder registers and receives said difference as an input; and
an addition circuit that calculates a sum of outputs of said plurality of remainder registers of said CRC operation circuit and bits of said FCS of said GFP frame when input to said GFP frame transfer apparatus.

10. The GFP frame transfer apparatus according to claim 9, wherein the FCS recalculation by said FCS recalculation section is performed by calculating said difference by said subtraction circuit, initializing all said plurality of remainder registers of said CRC operation circuit to 0, inputting said difference to said CRC operation circuit, inputting 0 by a number of bits of said payload field +32 to said CRC operation circuit and adding up outputs of said plurality of remainder registers and said bits of said FCS of said GFP frame when input to said GFP frame transfer apparatus using said addition circuit at a next clock.

11. A GFP frame transfer apparatus for transferring a GFP (Generic Frame Procedure) frame over a GFP network, comprising an FCS check/error notification bit setting section that, when said GFP frame transfer apparatus receives said GFP frame, carries out an error check using an FCS (Frame Check Sequence) of said GFP frame, and when this FCS check detects an error, sets an error notification bit in a predetermined field in an extension header area of said GFP frame.

12. The GFP frame transfer apparatus according to claim 11, wherein, when said FCS check by said FCS check/error notification bit setting section detects an error of the GFP frame to be transferred to a next GFP frame transfer apparatus, said GFP frame is not discarded, but transferred to the next GFP frame transfer apparatus with the FCS recalculated by said GFP frame transfer apparatus added.

13. The GFP frame transfer apparatus according to claim 11, wherein said GFP frame comprises a GFP ring frame and said predetermined field in which said error notification bit is set is provided in a part of a Spare field in an extension header area of said GFP ring frame.

14. The GFP frame transfer apparatus according to claim 1, wherein said GFP frame comprises a GFP ring frame.

15. The GFP frame transfer apparatus according to claim 1, wherein said GFP frame comprises a GFP path frame that stores a label corresponding to a path identification (ID)

defined to uniquely specify a path from an Ingress node to an Egress node in said GFP network in a predetermined field of an extension header area.

16. The GFP frame transfer apparatus according to claim 1, further comprising a packet extraction section that terminates a frame of a subnetwork that stores a packet to be stored in the payload field of said GFP frame and extracts said packet from the frame of said subnetwork.

17. The GFP frame transfer apparatus according to claim 16, wherein said packet extraction section extracts said packet by removing an unnecessary overhead for said subnetwork from a frame of said subnetwork.

18. The GFP frame transfer apparatus according to claim 16, wherein said subnetwork comprises Ethernet.

19. The GFP frame transfer apparatus according to claim 18, wherein said packet extraction section extracts said packet from a payload of an Ethernet frame of said Ethernet.

20. The GFP frame transfer apparatus according to claim 16 or claim 17, wherein said subnetwork comprises a POS (Packet Over SONET).

21. The GFP frame transfer apparatus according to claim 20, wherein said packet extraction section extracts said packet from a payload of an HDLC frame of said POS.

22. The GFP frame transfer apparatus according to claim 1, further comprising a GFP frame transmission section that stores said GFP frame in a layer 1 frame which comprises a first layer frame of an OSI reference model accommodating said GFP frame in said GFP network and sends said layer 1 frame storing said GFP frame from an appropriate output port of said GFP frame transfer apparatus to said GFP network.

23. The GFP frame transfer apparatus according to claim 22, wherein a SONET (Synchronous Optical NETwork) is used as the first layer of said OSI reference model.

24. The GFP frame transfer apparatus according to claim 23, wherein said GFP frame transmission section stores said GFP frame in a payload of a SONET frame of said SONET and sends said SONET frame storing said GFP frame to said GFP network.

25. The GFP frame transfer apparatus according to claim 22, wherein an OTN (Optical Transport Network) is used as the first layer of said OSI reference model.

26. The GFP frame transfer apparatus according to claim 25, wherein said GFP frame transmission section stores said GFP frame in an OPUk (Optical channel payload unit) which comprises a payload of a digital wrapper frame of said OTN and sends said digital wrapper frame that stores said GFP frame to said GFP network.

27. A GFP frame transfer method for transferring a GFP (Generic Frame Procedure) frame over a GFP network, comprising an FCS generating step of generating, when said GFP frame is generated and sent by said GFP frame transfer apparatus, an FCS (Frame Check Sequence) using a payload field, without a payload header, of said GFP frame as a generation target area and adding this FCS to an FCS field of said GFP frame.

28. The GFP frame transfer method according to claim 27, further comprising an FCS checking step of carrying out, when said GFP frame transfer apparatus receives said GFP frame, an FCS check using said payload field and said FCS field of said GFP frame.

29. The GFP frame transfer method according to claim 28, wherein when said FCS check in said FCS checking step detects an error of a GFP frame to be transferred to a next GFP frame transfer apparatus, said GFP frame is not discarded, but transferred to the next GFP frame transfer apparatus with a same FCS added when said error is detected.

30. The GFP frame transfer method according to claim 28, further comprising a monitoring control processing step of notifying, when said FCS check in said FCS checking step detects an error, of this error detection to a control system of said GFP network.

31. A GFP frame transfer method with a GFP frame transfer apparatus for transferring a GFP (Generic Frame Procedure) frame over a GFP network, comprising an FCS recalculating step of recalculating, when said GFP frame transfer apparatus receives a GFP frame and transfers said GFP frame to a next GFP frame transfer apparatus, an FCS of said GFP frame output from said GFP frame transfer apparatus, based on a difference of an extension header area of said GFP frame and an eHEC (extension Header Error Control) field before and after an update in said GFP frame transfer apparatus and the FCS (Frame Check Sequence) of said GFP frame when input to said GFP frame transfer apparatus, and adding this FCS to an FCS field of said GFP frame.

32. The GFP frame transfer method according to claim 31, further comprising an FCS checking step of carrying out, when said GFP frame transfer apparatus receives said GFP frame, an FCS check using said payload area and said FCS field of said GFP frame.

33. The GFP frame transfer method according to claim 32, wherein, when said FCS check in said FCS checking step detects an error of the GFP frame to be transferred to the next GFP frame transfer apparatus, said GFP frame is not discarded, but transferred to said next GFP frame transfer apparatus with said FCS recalculated in said FCS recalculating step added.

34. The GFP frame transfer method according to claim 32, further comprising a monitoring control processing step of notifying, when said FCS check in said FCS checking step detects an error, this error detection to a control system of said GFP network.

35. The GFP frame transfer method according to claim 31, wherein said FCS recalculating step comprises:
  a subtraction circuit that calculates said difference of said extension header area of said GFP frame and said eHEC field before and after an update in said GFP frame transfer apparatus;
  a CRC operation circuit that includes a plurality of remainder registers, provides feedback corresponding to a generating function G(x) of said FCS for said plurality of remainder registers and receives said difference as input; and
  an addition circuit that calculates a sum of outputs of said plurality of remainder registers of said CRC operation circuit and bits of said FCS of said GFP frame when input to said GFP frame transfer apparatus.

36. The GFP frame transfer method according to claim 35, wherein the FCS recalculation in said FCS recalculating step is performed by calculating said difference by said subtraction circuit, initializing all said plurality of remainder registers of said CRC operation circuit to 0, inputting said difference to said CRC operation circuit, inputting 0 by a number of bits of said payload field +32 to said CRC operation circuit and adding up said outputs of said plurality of remainder registers and said bits of said FCS of said GFP frame when input to said GFP frame transfer apparatus, using said addition circuit at a next clock.

37. A GFP frame transfer method with a GFP frame transfer apparatus for transferring a GFP (Generic Frame Procedure) frame over a GFP network, comprising an FCS check/error notification bit setting step of carrying out, when said GFP frame transfer apparatus receives said GFP frame, an error check using an FCS (Frame Check Sequence) of said GFP frame, and when this FCS check detects an error, setting an error notification bit in a predetermined field in an extension header area of said GFP frame.

38. The GFP frame transfer method according to claim 37, wherein, when said FCS check in said FCS check/error notification bit setting step detects an error of the GFP frame to be transferred to a next GFP frame transfer apparatus, said GFP frame is not discarded, but transferred to the next GFP frame transfer apparatus with the FCS recalculated by said GFP frame transfer apparatus added.

39. The GFP frame transfer method according to claim 37, wherein said GFP frame comprises a GFP ring frame and said predetermined field in which said error notification bit is set is provided in a part of a Spare field in an extension header area of said GFP ring frame.

40. The GFP frame transfer method according to claim 27, wherein said GFP frame comprises a GFP ring frame.

41. The GFP frame transfer method according to claim 27, wherein said GFP frame comprises a GFP path frame that stores a label corresponding to a path identification (ID) defined to uniquely specify a path from an Ingress node to an Egress node in said GFP network in a predetermined field in an extension header area.

42. The GFP frame transfer method according to claim 27, further comprising a packet extracting step of terminating a frame of a subnetwork that stores a packet to be stored in the payload field of said GFP frame and extracting said packet from the frame of said subnetwork.

43. The GFP frame transfer method according to claim 42, wherein in said packet extracting step, said packet is extracted by removing an unnecessary overhead for said subnetwork from the frame of said subnetwork.

44. The GFP frame transfer method according to claim 42, wherein said subnetwork comprises Ethernet.

45. The GFP frame transfer method according to claim 44, wherein in the packet extracting step, said packet is extracted from a payload of an Ethernet frame of said Ethernet.

46. The GFP frame transfer method according to claim 42, wherein said subnetwork comprises a POS (Packet Over SONET).

47. The GFP frame transfer method according to claim 46, wherein in said packet extracting step, said packet is extracted from a payload of an HDLC frame of said POS.

48. The GFP frame transfer method according to claim 27, further comprising a GFP frame transmitting step of storing said GFP frame in a layer 1 frame which is a first layer frame of an OSI reference model accommodating said GFP frame in said GFP network and sending said layer 1 frame storing said GFP frame from an appropriate output port of said GFP frame transfer apparatus to said GFP network.

49. The GFP frame transfer method according to claim 48, wherein a SONET (Synchronous Optical NETwork) is used as the first layer of said OSI reference model.

50. The GFP frame transfer method according to claim 49, wherein in said GFP frame transmitting step, said GFP frame is stored in a payload of a SONET frame of said SONET and said SONET frame storing said GFP frame is sent to said GFP network.

51. The GFP frame transfer method according to claim 48, wherein an OTN (Optical Transport Network) is used as the first layer of said OSI reference model.

52. The GFP frame transfer method according to claim 51, wherein in said GFP frame transmitting step, said GFP frame is stored in an OPUk (Optical channel payload unit) which is a payload of a digital wrapper frame of said OTN and said digital wrapper frame that stores said GFP frame is sent to said GFP network.

* * * * *